US011937561B2

(12) United States Patent
Cuello et al.

(10) Patent No.: US 11,937,561 B2
(45) Date of Patent: Mar. 26, 2024

(54) MOBILE AND MODULAR CULTIVATION SYSTEMS FOR VERTICAL FARMING

(71) Applicant: ARIZONA BOARD OF REGENTS ON BEHALF OF THE UNIVERSITY OF ARIZONA, Tucson, AZ (US)

(72) Inventors: Joel L. Cuello, Tucson, AZ (US); Yaser Mehdipour, Tucson, AZ (US); Jack Welchert, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 407 days.

(21) Appl. No.: 17/184,285

(22) Filed: Feb. 24, 2021

(65) Prior Publication Data
US 2021/0195847 A1    Jul. 1, 2021

Related U.S. Application Data

(63) Continuation-in-part of application No. PCT/US2019/048012, filed on Aug. 23, 2019.
(Continued)

(51) Int. Cl.
*A01G 9/02* (2018.01)
*A01G 9/24* (2006.01)

(52) U.S. Cl.
CPC ............. *A01G 9/023* (2013.01); *A01G 9/249* (2019.05)

(58) Field of Classification Search
CPC ........ A01G 18/62; A01G 31/06; A01G 9/022; A01G 9/249; A01G 9/023
See application file for complete search history.

(56) References Cited

U.S. PATENT DOCUMENTS

| 1,124,855 A | 1/1915 | Callow et al. |
| 1,308,587 A | 7/1919 | Heuser |

(Continued)

FOREIGN PATENT DOCUMENTS

| AT | 515084 A4 | 6/2015 | |
| CN | 107820922 A * | 3/2018 | ............. A01G 9/023 |

(Continued)

OTHER PUBLICATIONS

CN107820922A translation (Year: 2018).*
(Continued)

*Primary Examiner* — Monica L Perry
(74) *Attorney, Agent, or Firm* — NGUYEN TARBET LLC

(57) ABSTRACT

Modular cultivation systems utilized in a Vertical Farm or Plant Factory is described herein. The modular cultivation system has a growing module that includes an expandable and collapsible support frame with growing boards or pods, lighting boards, and an irrigation system arranged within the support frame to maximize the quantity of crops that can be grown within an available volume of space in a Vertical Farm unit, warehouse or greenhouse per unit time. The modular cultivation system further includes a mover robot for moving the growing module. The Vertical Farm relies on an ambulatory cultivation system and a cyclical automated operational protocol for planting, growing and harvesting made possible by the ambulatory growing module. Thus, access for crop planting, maintenance and harvesting is conveniently carried out through automation, that is, by commanding a specific ambulatory cultivation system to move autonomously to designated locations in the vertical farm.

10 Claims, 15 Drawing Sheets

Related U.S. Application Data

(60) Provisional application No. 62/851,505, filed on May 22, 2019, provisional application No. 62/723,119, filed on Aug. 27, 2018, provisional application No. 62/723,096, filed on Aug. 27, 2018, provisional application No. 62/722,436, filed on Aug. 24, 2018.

(56) References Cited

U.S. PATENT DOCUMENTS

| | | | |
|---|---|---|---|
| 1,383,881 | A | 7/1921 | Thomas |
| 2,041,184 | A | 5/1936 | Isenhour |
| 2,121,458 | A | 6/1938 | Vogelbusch |
| 3,108,146 | A | 10/1963 | Gross |
| 3,186,644 | A | 6/1965 | Ross et al. |
| 3,266,782 | A | 8/1966 | Gatsis et al. |
| 3,407,044 | A | 10/1968 | Buck |
| 3,630,498 | A | 12/1971 | Bielinksi |
| 3,779,531 | A | 12/1973 | White |
| 3,867,488 | A | 2/1975 | Porterfield |
| 3,911,064 | A | 10/1975 | McWhirter et al. |
| 3,997,447 | A | 12/1976 | Breton et al. |
| 4,193,950 | A | 3/1980 | Stockner et al. |
| 4,231,974 | A | 11/1980 | Engelbrecht et al. |
| 4,371,480 | A | 2/1983 | Vos |
| 4,465,645 | A | 8/1984 | Kaelin |
| 4,656,138 | A | 4/1987 | Redikultsev et al. |
| 4,779,990 | A | 10/1988 | Hjort et al. |
| 5,023,044 | A | 7/1991 | Negron |
| 5,073,262 | A | 12/1991 | Ahlberg et al. |
| 5,681,509 | A | 10/1997 | Bailey |
| 6,491,422 | B1 | 12/2002 | Rutten et al. |
| 6,955,462 | B1 | 10/2005 | Davies et al. |
| 7,086,778 | B2 | 8/2006 | Terentiev |
| 7,459,074 | B1 | 12/2008 | Sanchez |
| 8,151,518 | B2 | 4/2012 | Adams et al. |
| 8,181,387 | B2 * | 5/2012 | Loebl .................. A01G 9/249 47/18 |
| 8,651,766 | B2 | 2/2014 | Kortmann |
| 11,299,700 | B1 * | 4/2022 | Honigmann .......... C12M 25/06 |
| 2005/0218071 | A1 | 10/2005 | Austin et al. |
| 2007/0253288 | A1 | 11/2007 | Mennenga et al. |
| 2009/0141586 | A1 | 6/2009 | Dyer, III |
| 2009/0277083 | A1 | 11/2009 | Barnes |
| 2009/0293357 | A1 | 12/2009 | Vickers et al. |
| 2011/0058448 | A1 | 3/2011 | Reif et al. |
| 2012/0060416 | A1 * | 3/2012 | Brusatore ............. A01G 31/06 47/62 A |
| 2014/0079639 | A1 | 3/2014 | McDaniel |
| 2014/0083004 | A1 | 3/2014 | Mackenzie |
| 2015/0218254 | A1 | 8/2015 | Sabbadini et al. |
| 2015/0351329 | A1 * | 12/2015 | Heidl .................. A01G 9/247 211/49.1 |
| 2015/0373935 | A1 | 12/2015 | Anderson et al. |
| 2016/0130547 | A1 | 5/2016 | Venkataramu et al. |
| 2016/0262324 | A1 | 9/2016 | Yamane |
| 2017/0135290 | A1 * | 5/2017 | Sahni ..................... F21V 23/02 |
| 2018/0007841 | A1 * | 1/2018 | Gibson ............. B65D 21/0206 |
| 2018/0014485 | A1 | 1/2018 | Whitcher et al. |
| 2018/0054977 | A1 * | 3/2018 | Fok ....................... A01G 7/045 |
| 2019/0335692 | A1 * | 11/2019 | Speetjens ............... A01G 31/06 |
| 2021/0345553 | A1 * | 11/2021 | Eddins .................... A01G 9/12 |
| 2022/0217914 | A1 * | 7/2022 | Olsson .................. A01G 9/023 |
| 2023/0119599 | A1 * | 4/2023 | Ramaiah ............... A01G 9/249 362/237 |

FOREIGN PATENT DOCUMENTS

| | | |
|---|---|---|
| CN | 111758542 A | 10/2020 |
| EP | 2644025 A1 | 10/2013 |
| JP | 2010100795 A | 5/2010 |
| JP | 5325272 B2 | 10/2013 |
| KR | 20010100277 A | 1/2003 |
| KR | 20160053399 A | 5/2016 |
| KR | 102161188 B1 | 9/2020 |
| WO | 2020252364 A1 | 12/2020 |
| WO | WO-2020251355 A1 * | 12/2020 ............. A01G 31/06 |
| WO | 2021022169 A1 | 2/2021 |

OTHER PUBLICATIONS

Nayar, Gautam. Oxygen transport in animal cell bioreactors with vibrating-plate aerators. Diss. Massachusetts Institute of Technology, 1995.

Karimi et al. "Oxygen mass transfer in a stirred tank bioreactor using different impeller configurations for environmental purposes." Iranian journal of environmental health science & engineering 10.1 (2013): 1-9.

McKenna, P. Electroshocking plants bring chemical rewards. New Scientist. Mar. 28, 2008. 1-2.

Kim et al. Enhancement of mircoalga Haematococcus pluvialis growth and astaxanthin production by electrical treatment. Biosource Technology 268. Jun. 15, 2018. 815-819. Elsevier Ltd.

Kaimoyo et al. Sub-lethal level of Electric Current Elicit the Biosynthesis of Plant Secondary Metabolites. Biotechnol. Prog. 2008, 24, 377-384.

Pullagurala et al. "Plant uptake and translocation of contaminants of emerging concern in soil." Science of the Total Environment 636 (Sep. 15, 2018): 1585-1596. Abstract, p. 1592 col. 2 para 3; p. 1594 col. 1 para 3; Figure 2.

Kurade et al. "Uptake and biodegradation of emerging contaminant sulfamethoxazole from aqueous phase using lpomoea aquatica." Chemosphere 225 (Jun. 1, 2019): 696-704. Entire Document.

Recsetar et al. "Evaluation of a Recirculating Hydroponic Bed Bioreactor for Removal of Contaminants of Emerging Concern from Tertiary-Treated Wastewater Effluent." Chemosphere (Sep. 11, 2020): 128121. Entire Document.

Morrow, R. C., and T. M. Crabb. "Biomass production system (BPS) plant growth unit." Advances in Space Research 26.2 (2000): 289-298.

Porterfield et al. "A ground-based comparison of nutrient delivery technologies originally developed for growing plants in the space-flight environment." HortTechnology 10.1 (2000): 179-185.

Dreschel et al. "Examining Dehydration and Hypoxic Stress in Wheat Plants Using a Porous Tube Plant Nutrient Delivery System Developed for Microgravity." International Conference on Environmental Systems. No. O5ICES-64. 2005.

* cited by examiner

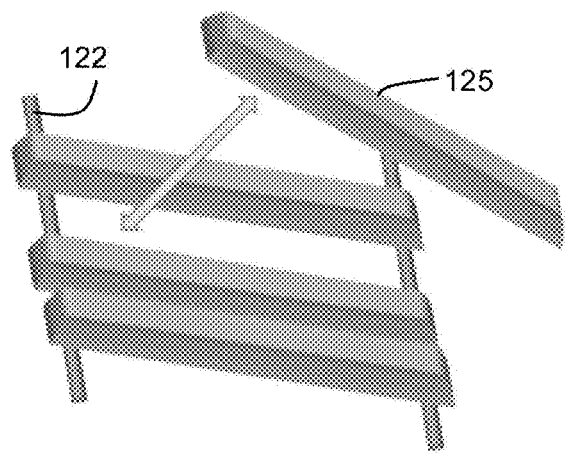 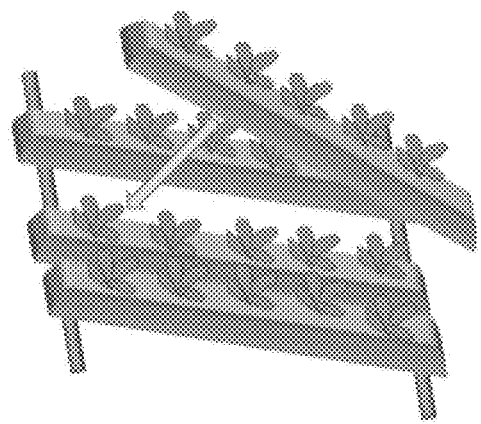
FIG. 3A                FIG. 3B
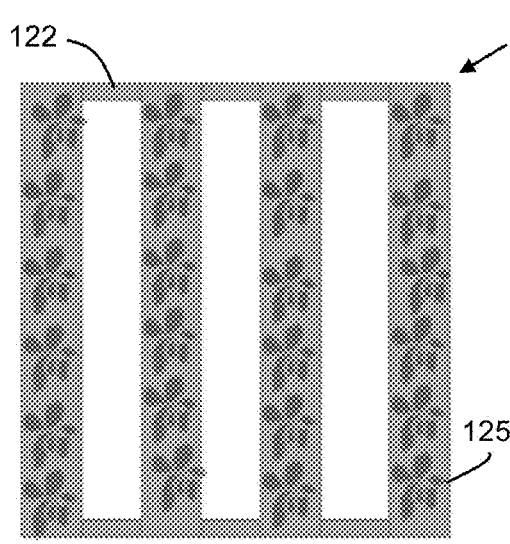 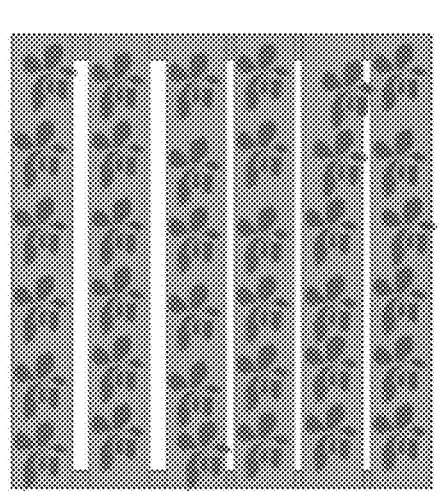
FIG. 4A                FIG. 4B
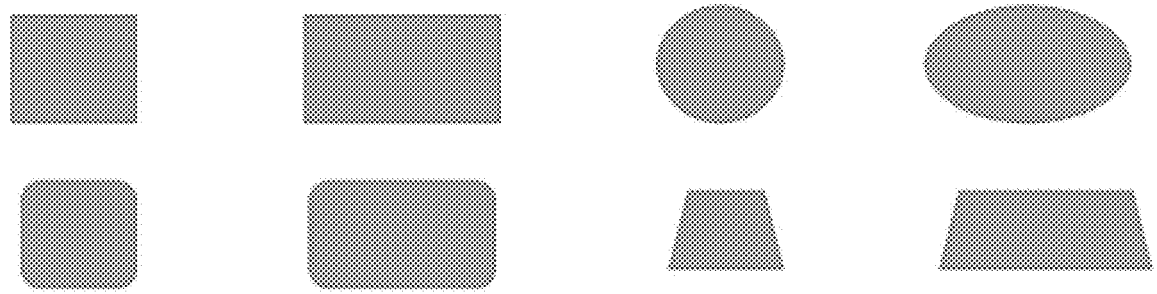
FIG. 5

MOBILE AND MODULAR CULTIVATION SYSTEMS FOR VERTICAL FARMING

CROSS-REFERENCES TO RELATED APPLICATIONS

This application is a Continuation-in-Part and claims benefit of PCT Application No. PCT/US19/48012 filed Aug. 23, 2019, and claims benefit of U.S. Provisional Application No. 62/722,436 filed Aug. 24, 2018, U.S. Provisional Application No. 62/723,096 filed Aug. 27, 2018, U.S. Provisional Application No. 62/723,119 filed Aug. 27, 2018, and U.S. Provisional Application No. 62/851,505 filed May 22, 2019, the specifications of which are incorporated herein in their entirety by reference.

FIELD OF THE INVENTION

The present invention relates to cultivation systems, namely, to an expandable and collapsible modular cultivation system that can maximize crop productivity within an available volume of space of a growing unit or structure. The cultivation systems may be used in mobile vertical farms (or go-vertical farm) and operational process for vertical farming.

BACKGROUND OF THE INVENTION

To meet the food demand of a global population that will increase from today's 7.6 billion to approximately 9.7 billion, the United Nations projects that food production will need to increase by 70%, necessitating a doubling in crop production from 10 billion tons to 20 billion tons by 2050. Given that agriculture already makes use of almost half of the land surface of the planet, consumes over 70% of all current freshwater withdrawals worldwide, and expends 30% of the global energy demand to food production and its supply chain, it is clear that a doubling of crop production will put enormous pressures on land, water and energy resources worldwide, particularly in arid and semiarid regions of the world.

People are drawn to live in cities because cities constitute the world's undisputed economic engine. Just 600 cities today account for about 60% of the global economic output. By 2025, the world's top 600 cities will be home to an estimated 220 million more people of working age and will account for more than 30% of the expansion of the potential global workforce. The biggest economic transformation the world has ever seen is occurring today simultaneously with the population expansion of cities in emerging markets, generating millions of new consumers with rising incomes and whose spending power will change the way the world shops—including people living in cities buying more of their food locally. An affirmative stance for urban agriculture is in part supported by the argument that cities, with their infrastructures and centralized planning for supplying water and energy as well as for treating and reusing wastewater and even generating renewable energy, lend themselves well to organized and potentially more efficient utilization of water and energy for crop production. It is clear, however, that it would be unrealistic to expect the world's cities to become fully food-secure by producing all of their food needs. The production of cereal crops (e.g., rice, wheat, barley, corn, etc.), for instance, remains best done in scalable open fields. The production, however, of salad and vegetable crops and certain fruit (e.g., strawberry)—which is enormous and very resource-intensive when conducted in open fields—can be reasonably implemented in or around many cities around the world.

Urban agriculture takes on several forms including establishing community gardens on vacant lots and, more recently, rooftop greenhouses. Vertical farming constitutes another form of urban agriculture in which the crops are produced in vertically stacked growing shelves or trays in an enclosed environment. There are three paradigms of vertical farms: (1) the warehouse vertical farm, (2) the skyscraper vertical farm, and (3) the modular vertical farm. Warehouse vertical farms, also referred to as plant factories, as pioneered in Japan typically employ hydroponics technology, or soil-less agriculture, through which crops are grown in liquid nutrient solutions. The crops are also provided either exclusive or supplemental electric lighting using fluorescent lamps or light-emitting diodes (LEDs). Japanese designed vertical farms have always focused on developing controlled-environment hydroponic technologies that enable intensive crop production with significantly increased yield (2× to 3×) at significantly reduced water input (about 80% to 90% less) and reduced land footprint, sometimes even without the need for arable land, as compared to open-field farming. The paradigm of the skyscraper vertical farm significantly popularized globally the concept of vertical farming. Fairly or unfairly, however, this paradigm closely associated vertical farming with grand architectural designs of awe-inspiring and often futuristic-looking edifices which, with their prohibitively high costs, projected at least for some time a perception of impracticality for vertical farming.

The current or conventional operational protocol for the vertical farm—regardless of paradigm—is designed around the fixed or immobile vertical farm. The fixed vertical farm is characterized by its tall, massive and complex immovable scaffolds or frames supporting multistory stacks of growing shelves. Thus, accessing the plants for maintenance or harvest requires the use of a cherry picker or any similar machinery. This, however, is highly inefficient, cumbersome and labor-intensive.

To devise a new strategy for designing and developing vertical farms that can achieve economic feasibility, it was crucial to decouple the concept of vertical farms from conventional buildings to which vertical farms became inadvertently intertwined. A promising and emerging paradigm of vertical farming is the minimally structured, modular and prefabricated structures that would be capable of supporting agricultural operations and makes use of standardized modular units. The present invention features an expandable and collapsible modular cultivation system that can be used in a modular Vertical Farm or Plant Factory as well as a warehouse-type or greenhouse-type of vertical farm or plant factory.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

It is an objective of the present invention to provide cultivation systems that can maximize crop productivity within the available volume of space of a growing unit or structure, as specified in the independent claims. Embodiments of the invention are given in the dependent claims. Embodiments of the present invention can be freely combined with each other if they are not mutually exclusive.

In some aspects, the mobile vertical farm of the present invention is a novel and original operational process for vertical farming that has two principal components: (1) the ambulatory growing module LifeGrow Robot or LGBot; and (2) the circular automated operational protocol for planting, growing and harvesting made possible by the LGBots. The automated operational process of the mobile vertical farm may be applicable to each of the three paradigms of vertical farm, especially to the currently predominant and conventional warehouse vertical farm.

In one embodiment, the present invention features a modular cultivation system comprising a growing module having a frame structure configured to support a plurality of growing trays for containing crops; and a mover robot for imparting mobility to the growing module. The growing module is preferably disposed on top of the mover robot. The system may further include a light module comprising a plurality of light sources configured to provide lighting to the crops contained in the growing trays.

In other aspects, the present invention features a vertical farm system comprising a plurality of the ambulatory modular cultivation systems or units are described, a planting section for planting crops, a growing section for growing crops, and a harvesting section for harvesting crops. The growing section, planting section, and harvesting section are preferably separate from each other. The ambulatory modular units can travel from one section to another section via the mover robot. In one embodiment, depending on a stage of growth of the crops, the growing module can be removed from or added to the mover robot by mechanical or robotic arms or lifts.

In some embodiments, the growing section, planting section, and harvesting section are each separate rooms. For instance, the vertical farm system may be housed in a single-story warehouse divided into multiple rooms. In other embodiments, the growing section, planting section, and harvesting section are located on different levels. As an example, the vertical farm system may be housed in a multi-level building. In other embodiment, the system may comprise a plurality of growing sections, planting sections, and harvesting sections. The plurality of growing sections may be located on different levels. Furthermore, each level may have its own harvesting and planting section in addition to a growing section. Alternatively, each level may contain only one of the growing, harvesting, or planting sections. In some embodiments, the ambulatory modular system can travel from one level to another level via an elevator. In some embodiments, the system may further comprise a germinating section for starting new crops separately from crops in later stages of growth. In still other embodiments, the system may further comprise a packing section for packaging harvested crops.

In conjunction with previous aspects of the present invention, a method for cultivating crops can utilize the vertical farm system described herein. The method may comprise planting crops in the growing modules in the planting section of the vertical farm system, transferring the ambulatory modular units from the planting section to the growing section of the vertical farm system, transferring ambulatory modular units that contain crops ready for harvest from the growing section to the harvesting section of the vertical farm system, and harvesting the crops. Preferably, the process is made cyclical by repeating the steps of planting, transferring, and harvesting as new crops are planted and older crops are harvested. In further embodiments, the method may include germinating crops in a separate germinating section prior to planting, and packing crops in a separate packing section after harvesting.

In some aspects, the growing module is an expandable and collapsible modular cultivation system constructed using minimally-structured, modular and/or prefabricated structures capable of supporting agricultural operations. The principal design advantages of the growing module include its storability, portability and its capacity to maximize the quantity of crops that can be grown within the available volume of space in a modular unit, warehouse or greenhouse per unit time. The expandability/collapsibility feature of the growing module also makes it ideal for application in remote locations on Earth as well as in extraterrestrial life support systems on the Lunar or the Martian surface.

The growing module of the present invention is conveniently amenable to automation and remote control for its various operations. Without wishing to limit the invention to a particular theory or mechanism, the growing module includes the following critical features: (1) Minimally-structured so as to reduce materials, reduce total weight, reduce load-bearing requirement, and reduce plumbing and electrical services; (2) Modular so as to provide uniformity of growing space, hardware and environmental control, consistency of operational procedures, interchangeability of units, and allow use of varied growing systems and development of turn-key operations; and (3) Prefabricated to enable off-site construction and assembly of modules and significantly lower cost in construction and labor. None of the presently known prior references or work have the unique and inventive features of the present invention.

According to some embodiments, the growing module may be an i-Incline Green Box. To achieve expandability/collapsibility, the i-Incline Green Box employs a combination of extendable/retractable support tubes and angle-adjustable growing boards and lighting boards, resulting in a unique and adjustable overall architecture and morphology as well as functionalities. In some embodiments, the principal structural components of the i-Incline Green Box include: (1) the Lighting Board (L-Board) with the light tubes, rods or lamps; (2) the Growing Board (G-Board) with the cultivation trays/tubes; (3) the Hydroponic Tank; (4) the pump; (5) the extendable/retractable supporting tubes; and (6) the module wheels. The dimensions of the i-Incline Green Box may be adjusted to practically fit the available volume of space in a Vertical Farm or Plant Factory modular unit. In this way, crop productivity is maximized within the available volume of space in the Vertical Farm or Plant Factory modular unit. Alternatively or in combination, multiple modular units of the i-Incline Green Box may be used.

According to other embodiments, the growing module may be an i-Sprout Green Box. To achieve expandability/collapsibility, the i-Sprout Green Box employs a combination of vertical support frames with extendable/retractable support tubes (or cross-link mechanism) and expandable/collapsible growing trays with cross-link mechanism, resulting in a unique and adjustable overall architecture and morphology as well as functionalities. In one embodiment, the principal structural components of the i-Sprout Green Box include: (1) the collapsible/expandable Growing Tray; (2) the Lighting Board; (3) the extendable/retractable supporting tubes; and (4) the Storage Box/Hydroponic Tank. In some embodiments, a reservoir can act as a storage box of the i-Sprout Green Box when it is not in use, and as a hydroponic tank for storing liquid nutrients when the i-Sprout Green Box is in use. The dimensions of the i-Sprout Green Box may be adjusted to practically fit the available volume of space in a Vertical Farm or Plant Factory modular unit. In this way, crop productivity is maximized within the available volume of space in the Vertical Farm or Plant Factory modular unit. Alternatively or in combination, multiple modular units of the i-Sprout Green Box may be used.

In some embodiments, each growing board may comprise a plurality of growing trays removeably attached to the growing board. Preferably, the growing trays are configured for containing and growing crops. The crop production mode may be hydroponics, aeroponics, soil-based, or a combination thereof. In another embodiment, the growing trays may be disposed parallel to each other. In preferred embodiments, a growing space formed between two adjacent growing trays of the growing board may be adjusted. For instance, the growing trays/tubes can be movable along the same growing board to adjust the growing space. The growing space may be determined based on a height and other morphological features of the specific crop being grown for optimization of physical spacing and incident lighting. In some embodiments, the growing board may comprise one or more panels, a skeletal growing frame, or a combination thereof. The panel may be substantially transparent or non-transparent. In some embodiments, the growing trays may be tubular, rectangular or of any geometric configuration.

In other embodiments, each lighting board may comprise a plurality of light sources removeably attached to a lighting board and configured to provide lighting to the crops. The light sources may be disposed parallel to each other. Preferably, a light spacing formed between two adjacent light sources of the lighting board may be adjustable to allow for optimal lighting of the crops. For instance, the light sources may be movable along the lighting board. The lighting space may be determined based on the height and other morphological features of the specific crop being grown for optimization of incident lighting. In some embodiments, the lighting board may comprise one or more panels, a skeletal lighting frame, or a combination thereof. The panel may be substantially transparent or non-transparent. Examples of the light sources include but are not limited to, light emitting diodes (LEDs), fluorescent tubes, or a combination thereof.

According to other aspects, the growing module may be an i-Abacus Green Box. To achieve expandability/collapsibility, the principal structural components of the i-Abacus Green Box include a combination of: (1) the expandable/collapsible growing pods, each equipped with its own hydroponic unit and lighting board; and (2) the expandable/collapsible support frame that houses multiple growing pods. Each pod may be equipped with its own hydroponic unit and lighting board, resulting in a unique and adjustable overall architecture and morphology as well as functionalities. In some embodiments, The dimensions of the i-Abacus Green Box, including its support frame and growing pods, may be adjusted to practically fit in the available volume of space in a Vertical Farm or Plant Factory modular unit, thereby maximizing crop productivity within the available volume of space. Alternatively or in combination, multiple modular units of the i-Abacus Green Box may be used.

In some embodiments, flexible hydroponic tubing may fluidly connect a pump to a growing tray or growing pod. Growing trays may be fluidly connected to other growing trays. Growing pods may be fluidly connected to other growing pods. The pump can pump the liquid nutrients from a hydroponic tank to the growing tray or growing pod. The growing trays or growing pods can be conveniently connected to or disconnected from the flexible hydroponic tubing. The flexible hydroponic tubing can convey and re-circulate liquid nutrients between the hydroponic tank and the growing trays or growing pods.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Other technical advantages may become readily apparent to one of ordinary skill in the art after review of the following figures and description.

BRIEF DESCRIPTION OF THE DRAWINGS

The features and advantages of the present invention will become apparent from a consideration of the following detailed description presented in connection with the accompanying drawings in which:

FIG. 2A is a side view of a stowed or collapsed configuration of the i-Incline Green Box. FIG. 2B is a side view of a partially expanded configuration of the i-Incline Green Box, with some of the supporting tubes vertically extended. FIG. 2C shows a side view of the expanded configuration of the i-Incline Green Box, with some of the supporting tubes vertically extended and the angles of the growing boards increased relative to the horizon. FIG. 2D shows a side view of the expanded configuration of the i-Incline Green Box, with some of the supporting tubes vertically extended and the angles of the growing boards and the lighting boards increased relative to the horizon.

FIGS. 3A-3B are isometric views of the i-Incline Green Box's growing board showing its detachable growing trays or tubes.

FIG. 4A shows a top view of the i-Incline Green Box's growing board with four parallel trays.

FIG. 4B shows a top view of the i-Incline Green Box's growing board with six parallel trays.

FIG. 5 shows non-limiting examples of possible cross-sectional shapes for the detachable growing trays or tubes of the i-Incline Green Box's growing board.

FIG. 8A shows a stowed or collapsed configuration of the structural body fits that can fit inside a portable storage box/hydroponic tank. FIG. 8B shows a partially expanded configuration with some of the supporting tubes vertically extended. FIG. 8C shows a partially expanded configuration with all of the supporting tubes vertically extended. FIG. 8D shows an expanded configuration with all of the supporting tubes vertically extended and all of the growing trays expanded.

DESCRIPTION OF PREFERRED EMBODIMENTS

Figure 1:
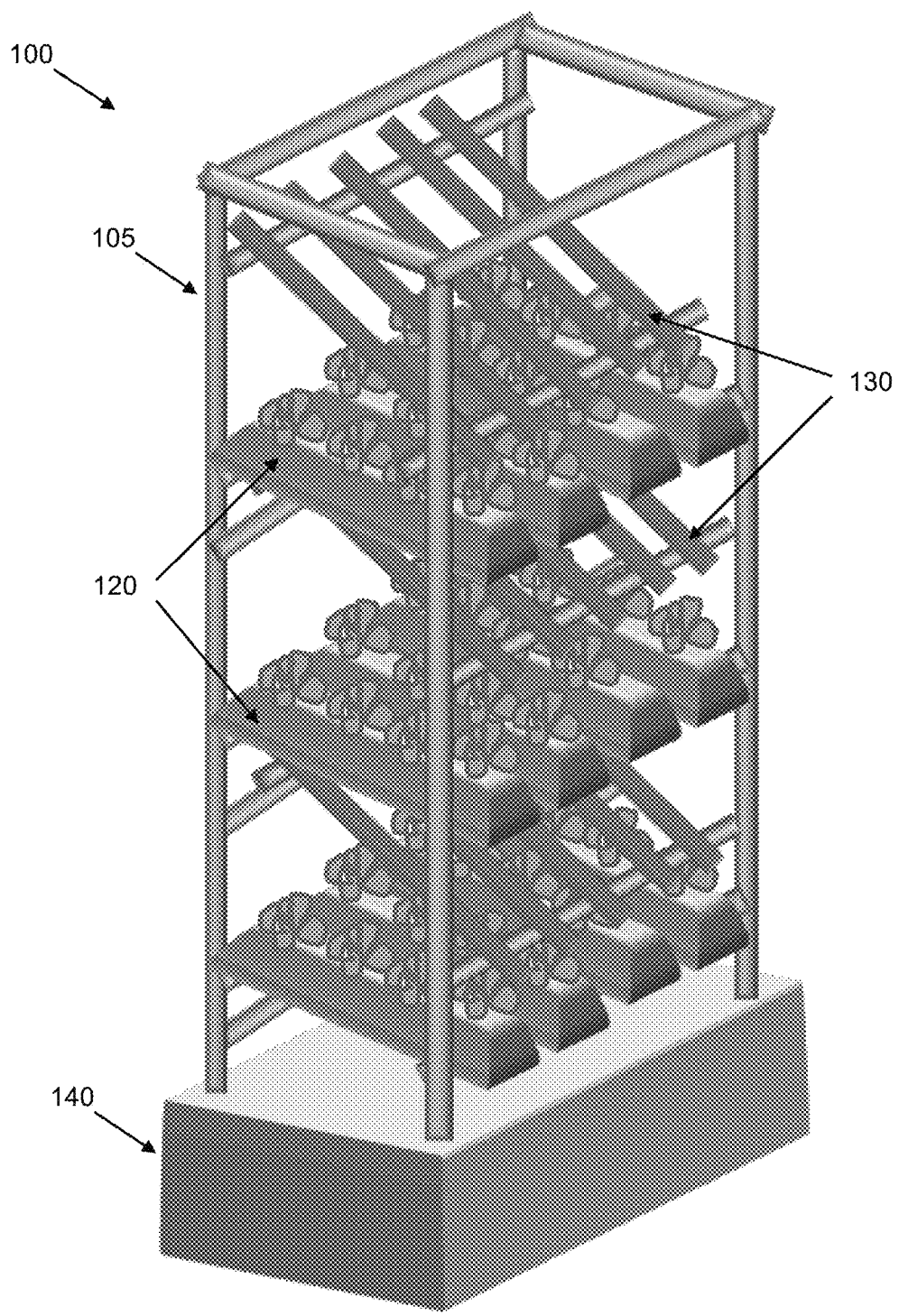
FIG. 1 shows a non-limiting embodiment of a modular cultivation system of the present invention, referred to herein as the "i-Incline Green Box".

Following is a list of elements corresponding to a particular element referred to herein:
100, 200, 300 growing module
105 i-Incline green box
110, 210, 310 frame structure
115, 215, 315 support frame
120 growing board
122, 222 growing frame
125, 220, 325 growing trays
127 angle of growing board
130 lighting board
132 lighting frame
135 light sources
137 angle of lighting board
140 reservoir
150 pump
160 tubing
165 discharge hose
170 module wheels
205 i-Sprout green box
216 supporting tubes
218 X-shaped subassemblies
224 flexible polymer liner
226 growing tray lid
305 i-Abacus green box
317 pod openings
318 cross-linked subassembly
319 bar member
320 growing pod
322 pod housing
323 housing panels
328 ventilation fan
340 hydroponic unit
345 hydroponic unit reservoir
400 moving robot
500 modular cultivation system Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components. As used herein, "each" refers to each member of a set or each member of a subset of a set.

Growing Module

According to some embodiments, the present invention features a modular cultivation system (500) comprising a growing module (100). Various embodiments of the growing module (100) are described in the following sections. As used herein, the terms "Green Box" and "growing module" may be interchangeable.

The i-Incline Green Box

Referring to FIG. 1, in one embodiment, the growing module (100) is an i-Incline green box (105). In some embodiments, the i-Incline green box (105) may comprise a frame structure (110) comprising an adjustable vertical support frame (115), a plurality of growing boards (120) coupled to the vertical support frame (115), and a plurality of lighting boards (130) coupled to the vertical support frame (115). The growing boards (120) are vertically stacked in parallel, with a lighting board (130) disposed above one growing board (120). In other embodiments, the i-Incline green box (105) further comprises a plurality of growing trays (125) removeably attached to the growing board (120) and a plurality of light sources (135) attached to lighting board (130). The growing trays (125) are configured to contain crops and the light sources (135) are configured to provide lighting to the crops contained in the growing trays (125) directly below the light sources (130).

Figure 2A:
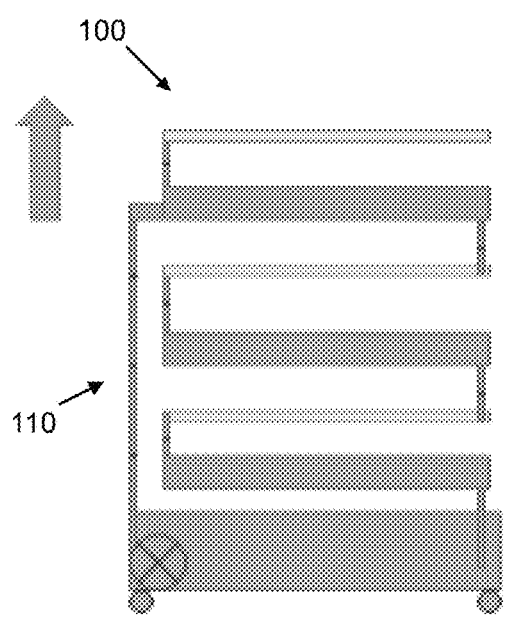
FIGS. 2A-2D shows the steps of how the structural body of the i-Incline Green Box can be vertically expanded. The main structural components of the i-Incline Green Box includes (1) the lighting board (L-Board) with the light tubes, rods or lamps; (2) the growing board (G-Board) with the cultivation trays/tubes; (3) the hydroponic tank; (4) the pump; (5) the extendable/retractable supporting tubes; and (6) the module wheels. Note that the supporting elements or members needed to achieve structural stability for the i-Incline Green Box are not shown.
Figure 2B:
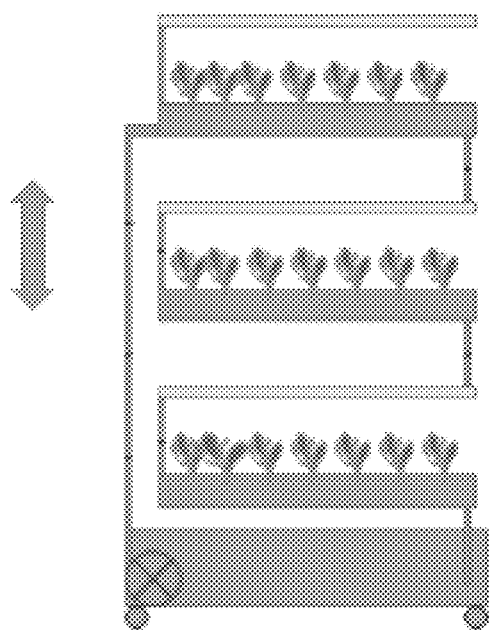
Figure 2C:
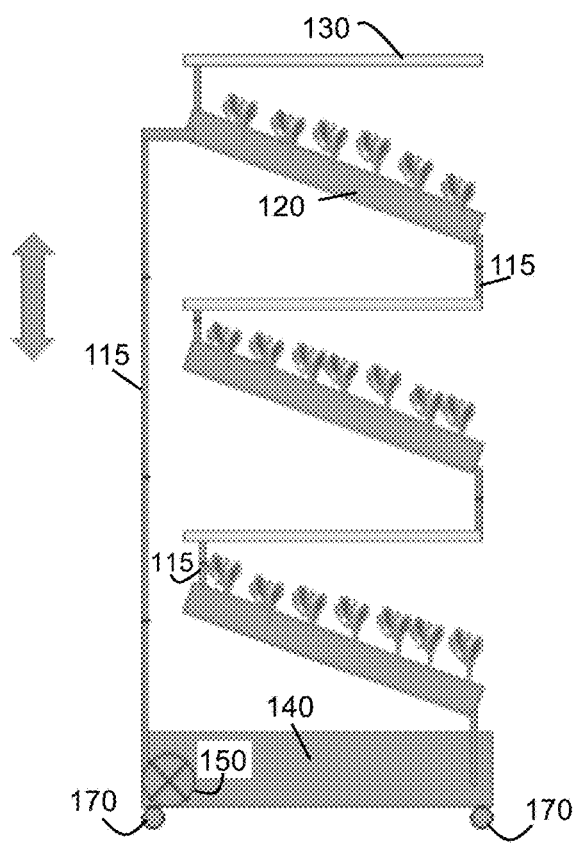
Figure 2D:
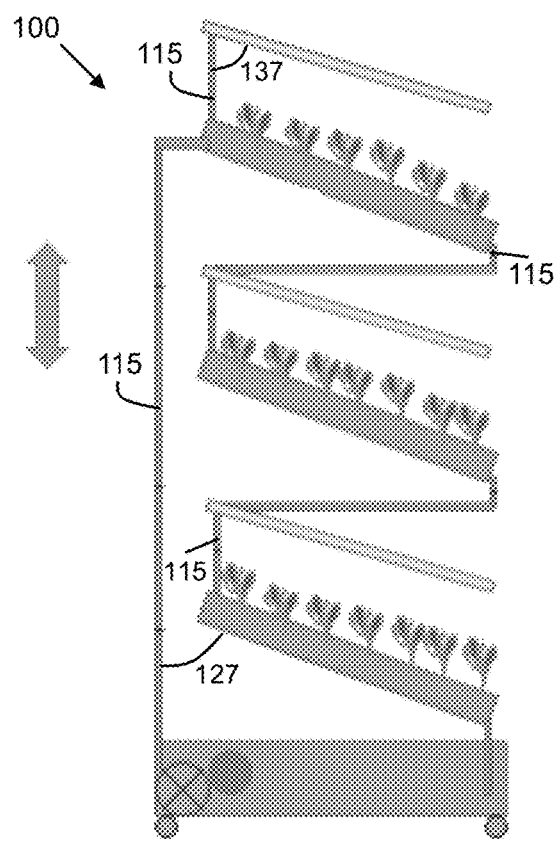

Without wishing to limit the present invention, the adjustable vertical support frame (115) is configured to be adjusted to increase a height of the vertical support frame (115). By adjusting the vertical support frame (115), the spacing between the growing boards (120) is adjusted. In some embodiments, an angle (127) of each growing board relative to the vertical support frame (115) can be 90° (FIGS. 2A-2B) or adjusted to an acute angle, e.g. less than 90° (FIGS. 2C-2D). Each growing board (120) may be configured to pivot about the vertical support frame (115) to change the angle (127). In other embodiments, an angle (137) of each lighting board relative to the vertical support frame (115) can be 90° (FIG. 2C) or adjusted to an acute angle (FIG. 2D). The lighting boards (130) may be configured to pivot about the vertical support frame (115) to change the angle (137).

In some embodiments, the growing board (120) may include a growing frame (122) for supporting the growing trays (125). Referring to FIGS. 3A-3B, the growing trays (125) can be removeably attached to the growing frame (122), for instance, by a snap-connection, joints, or other fittings. In other embodiments, the lighting board (130) may comprise a lighting frame (132) for supporting the light sources (135). Similarly, the light sources (135) can be removeably attached to the lighting frame (132) via snap-connections, joints, or other fittings.

In one embodiment, the growing trays (125) may be parallel to each other and oriented laterally or longitudinally on the growing board (120). In another embodiment, the light sources (135) may be parallel to each other and oriented laterally or longitudinally on the lighting board (135). In some embodiments, the growing trays (125) may be perpendicular or parallel to the light sources (135) directly above the growing trays (125). The light sources (135) may comprise light emitting diodes (LEDs), fluorescent tubes, lamps, or a combination thereof. In one embodiment, the light sources (135) emit light in the same wavelength, for example, red or blue light. In another embodiment, the light sources (135) may emit light in varying wavelengths, for example, a combination of red light sources and blue light sources.

In preferred embodiment, the vertical support frame (115) can be adjusted to modify the spacing between the growing boards (120) and the lighting boards (130). By adjusting the spacing of the growing and lighting boards, this allows for adjustment of a distance between the crops and the light sources to allow for optimal lighting of the crops. The distance between the crops and the light sources may be based on a height and other morphological features of the specific crop being grown for optimization of physical spacing and lighting of the crops.

In other embodiments, the spacing between the trays can be adjusted so as to provide sufficient growing space for the plants. This increases the convenience and efficiency of the planting or harvesting operation. As shown in FIGS. 3A-3B, the orientation of the parallel growing trays or tubes may be horizontal when viewing the growing board from the top. In FIGS. 4A-4B, the orientation of the parallel growing trays or tubes may be vertical when viewing the growing board from the top. In some embodiments, the growing board may comprise a variable number of growing trays or tubes ranging from about 2-20. For instance, FIG. 4A shows 4 growing trays whereas FIG. 4B shows 6 growing trays. Referring to FIG. 5, each growing tray or tube may assume a number of possible geometric cross-sectional shapes including, but not limited to, square and rectangular with sharp or rounded corners, circular, elliptical, trapezoidal, etc.

Figure 15A:
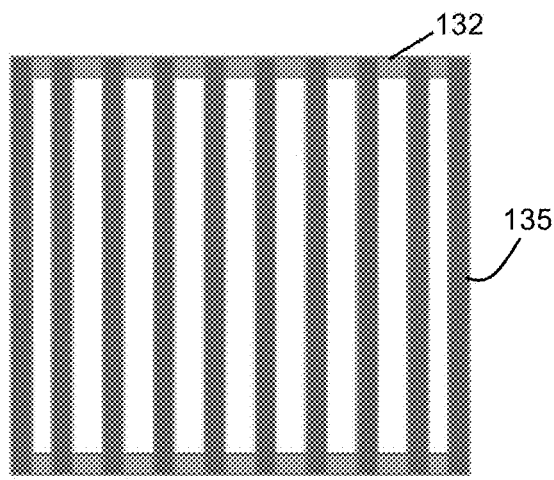
FIG. 15A is a top view of the lighting board with 10 parallel red Light Emitting Diode (LED) rods.
Figure 15B:
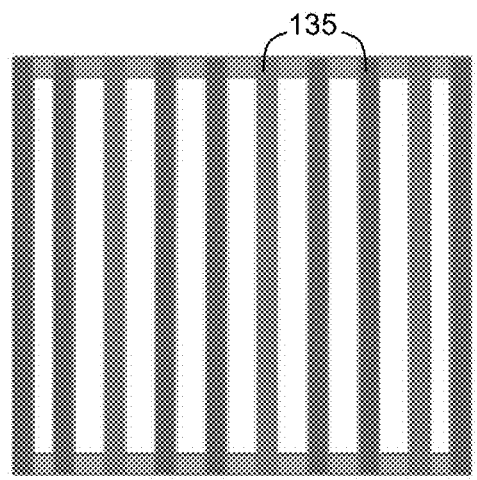
FIG. 15B is a top view of the lighting board with 10 parallel red and blue LED rods.
Figure 16A:
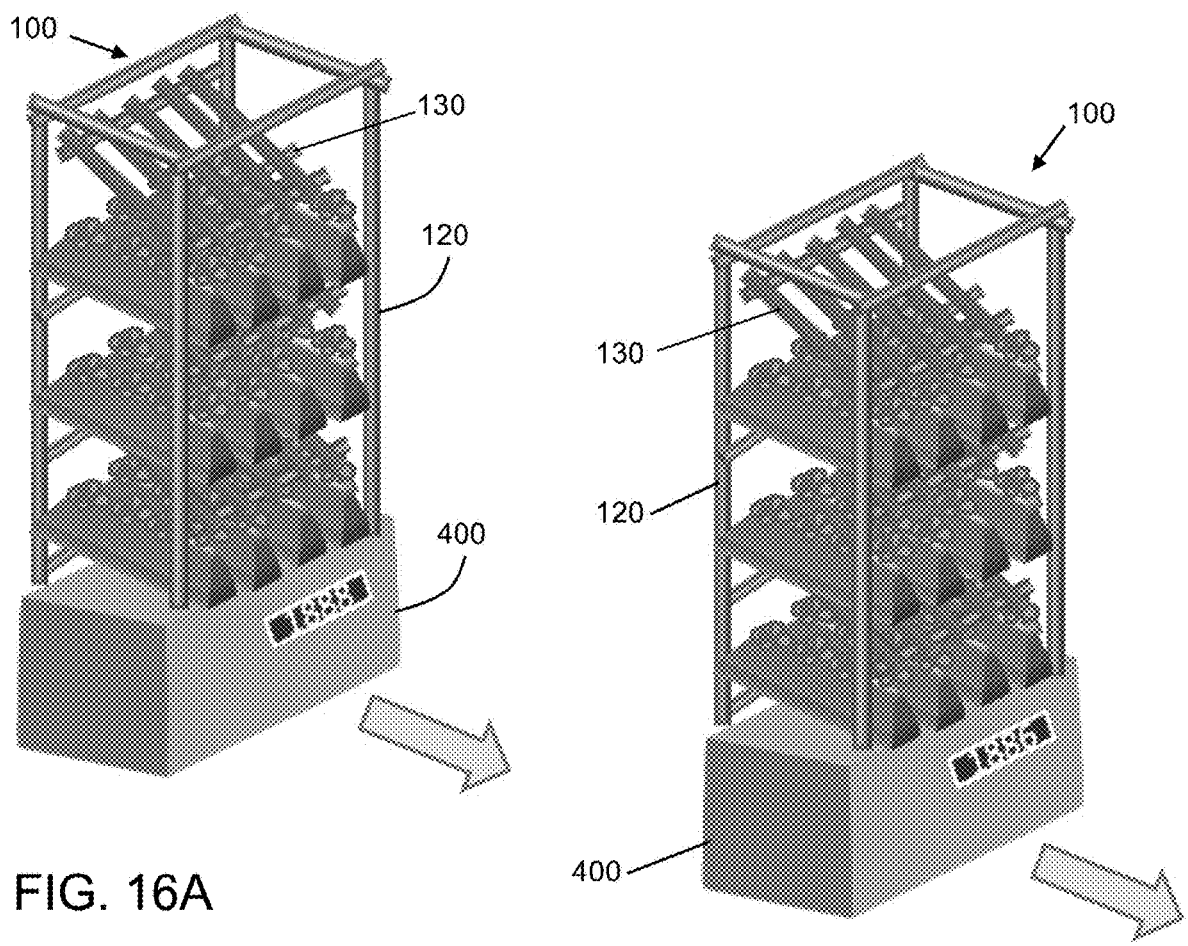
FIG. 16A is a non-limiting embodiment of an ambulatory, modular cultivation system with an i-Incline Green Box disposed on a mover robot, referred to herein as the "Life-Grow Robot" or "LGBot".
Figure 16B:
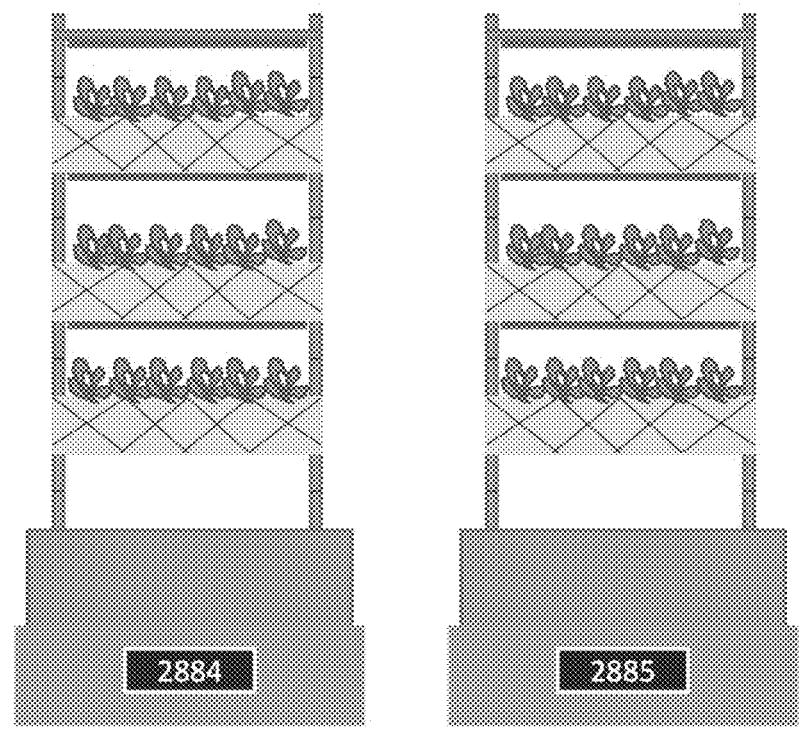
FIG. 16B is a non-limiting embodiment of an ambulatory LGBot with an i-Sprout Green Box disposed on the mover robot.
Figure 16C:
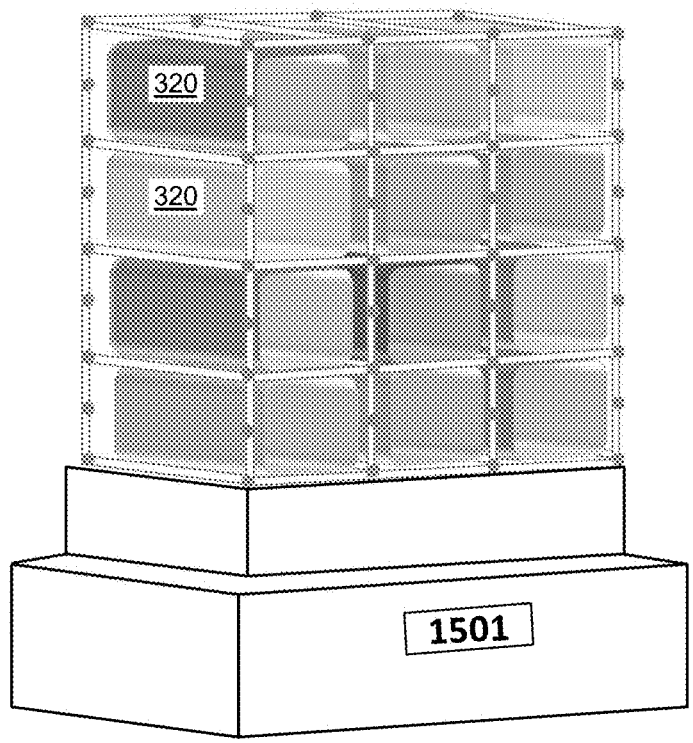
FIG. 16C is a non-limiting embodiment of an ambulatory LGBot with an i-Abacus Green Box disposed on the mover robot.
Figure 16D:
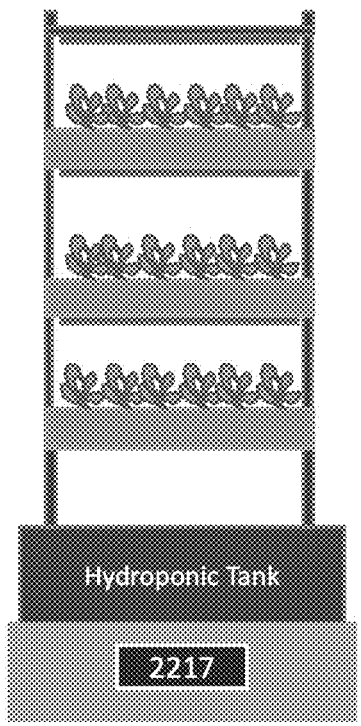
FIG. 16D is a non-limiting example of the ambulatory LGBot whose growing module on the mover robot is a generic hydroponic system comprised of stacks of linked hydroponic trays.
Figure 16E:
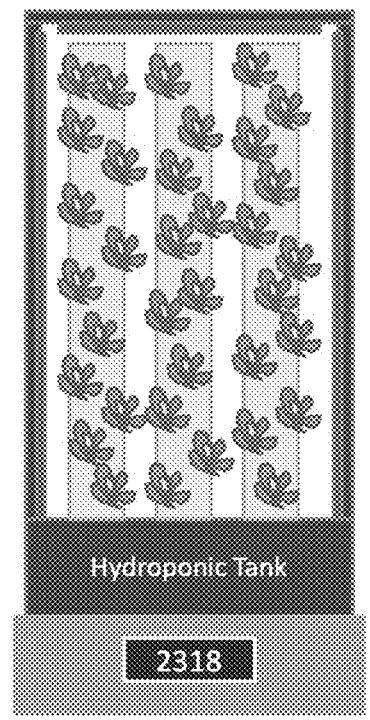
FIG. 16E is another non-limiting example of the ambulatory LGBot whose growing module on the mover robot is a generic hydroponic system comprising vertical hydroponic columns with circular, square, or rectangular cross-sections.

Referring to FIGS. 15A-15B, in some embodiments, the lighting board comprising light rods or lamps can be attached to or detached from the frame of the lighting board. For example, the detachable light rods or tubes can be conveniently connected to or disconnected from the electrical fixtures attached to the frame of the lighting board. This increases the convenience and efficiency of modifying the light quality (or light wavelength combinations) by simply mixing various colors, such as red and blue light emitting diodes (LEDs). In some embodiments, the lighting board has a variable number of light rods or lamps ranging from about 2 to 20. Preferably, the spacing between the light rods or lamps can be adjusted for efficient illumination of the plants in the growing boards as well as reduced energy consumption. The orientation of the parallel light rods or tubes may be vertical or horizontal relative to the top view of the lighting board. As show in FIG. 1, the growing boards and the lighting boards may be arranged within the frame structure in an alternating pattern such that each lighting board is positioned over a growing board, thereby exposing the growing board to incident lighting from above. In one embodiment, the number of light sources may be the same as the number of growing trays. Alternatively, the number of light sources may be the different from the number of growing trays.

In some embodiments, the frame structure (110) may further comprise panels for covering the frame structure. In other embodiments, the i-Incline green box (105) may further include module wheels (170) disposed at a base of the vertical frame structure (110) for imparting mobility to the i-Incline green box (105). The vertical support frame (115) may comprise extendable and retractable supporting tubes, e.g. telescoping tubes. Referring to FIGS. 2A-2D, the expansion of the structural body of the i-Incline Green Box is achieved through vertical extension of the supporting tubes, and increasing the angles of the growing boards and/or the lighting boards relative to the horizon. As used herein, the term "horizon" refers to a horizontal plane, such as the ground or floor on which the i-incline Green Box stands.

In some embodiments, the i-Incline green box (105) may further comprise a reservoir (140) for storing liquid nutrients. The reservoir (140) may be disposed at or near a base of the vertical support frame (110). The i-Incline green box (105) may further include a pump (150) and tubing (160) for connecting the pump (150) to the growing boards (120) in order to pump liquid nutrients from the reservoir (140) to the growing boards (120). In one embodiment, a main tubing channel may be connected to each growing board. For example, each main tubing channel may be fluidly connected to a manifold which connects to the flexible hydroponic tubing of each growing tray on the same growing board. A connection between the main tubing channel and manifold may comprise a valve for controlling the flow rate of fluids to the growing board. The growing trays (125) may be fluidly connected to the growing boards (120) via tubing that delivers the liquid nutrients to the individual growing trays (125). The pump can pump the liquid nutrients from the hydroponic tank to the growing boards. A discharge hose may fluidly connect the growing boards (120) to the reservoir (140) for discharging the liquid nutrients, thus recycling the nutrient solution. For example, each growing tray may be connected to the hydroponic tank via a flexible discharge hose. The detachable growing trays can be conveniently connected to or disconnected from the flexible hydroponic tubing. The flexible hydroponic tubing can convey and re-circulate liquid nutrient solution between the growing trays or tubes on the different growing boards and the hydroponic tank. The tubing may be polymer tubing, preferably transparent tubing to allow for visual inspection of the channels.

In an alternative embodiment, a main tubing channel may be connected to the top-most growing board. The top-most growing board may be fluidly coupled to a second top-most growing board, the second top-most growing board may be fluidly coupled to a lower growing board, and so forth. In this configuration, the fluids can be introduced to the top-most growing board, instead of each growing board, and the fluids can be recycled and gravity fed from the upper growing board to the lower growing board. The lower-most growing board may be connected to the hydroponic tank via a flexible discharge hose for recycling the liquid nutrients.

The i-Sprout Green Box

Figure 6:
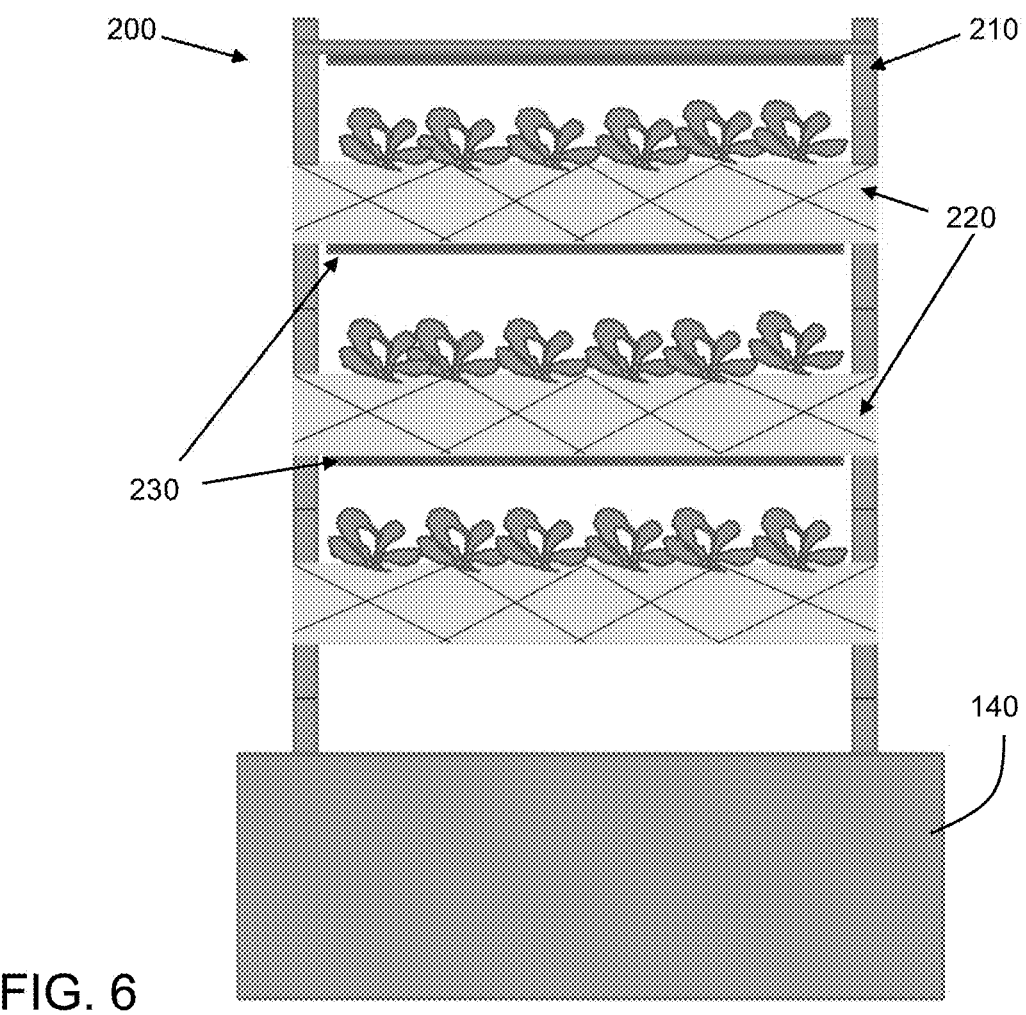
FIG. 6 shows another non-limiting embodiment of a modular cultivation system of the present invention, referred to herein as the "i-Sprout Green Box", in a partially expanded configuration with all of the supporting tubes vertically extended and crops growing on the expanded growing trays.

Referring to FIG. 6, in one embodiment, the growing module (200) is an i-Sprout green box (205). A structural body of the i-Sprout Green Box can vertically expand and collapse. The expansion of the structural body of the i-Sprout Green Box is achieved through vertical extension of the supporting tubes; and vertical expansion of the growing trays. In some embodiments, the material for the supporting tubes and the storage box/hydroponic tank may be any rigid material, including metal or polymer. The extendable/retractable supporting tubes may be replaced by or used in combination with other support mechanisms that would achieve the desired expansion/collapse of the structural body of the i-Sprout Green Box, including a cross-link mechanism.

According to some embodiments, the modular cultivation system (500) comprises an i-Sprout green box (205) as shown in FIG. 6. The i-Sprout green box (205) may comprise a frame structure (210) comprising an adjustable vertical support frame (215), a plurality of collapsible and expandable growing trays (220) attached to the frame structure (210), and a plurality of lighting boards (130), each comprising one or more light sources (135). In one embodiment, the growing trays (220) are stacked in parallel. The lighting boards (130) may be attached to the frame structure (210) or a bottom surface of the growing tray such that each growing tray (220) has a lighting board (130) disposed directly above it. Preferably, the growing trays (220) are configured to contain crops, and the light sources (135) are configured to provide lighting to the crops contained in the growing tray (220) directly below the light sources. When the i-Sprout green box (205) is in use, the vertical support frame (215) and the growing trays (220) are in an expanded configuration. Conversely, when the i-Sprout green box (205) is in storage or not in use, the adjustable vertical support frame (215) and the growing trays (220) are in a collapsed configuration.

In preferred embodiments, the vertical support frame (215) can be adjusted to increase a height of the vertical support frame (215), thereby modifying the space between the growing trays (220) and the space between the growing trays (220) and the lighting boards (130). By adjusting the spacing of the growing and lighting boards, this allows for adjustment of a distance between the crops and the light sources to allow for optimal lighting of the crops. Without wishing to limit the invention, the spacing between the trays can be adjusted so as to further provide sufficient growing space for the plants. This increases the convenience and efficiency of the planting or harvesting operation. The distance between the crops and the light sources may be based on a height and other morphological features of the specific crop being grown for optimization of physical spacing and lighting of the crops.

Figure 8A:
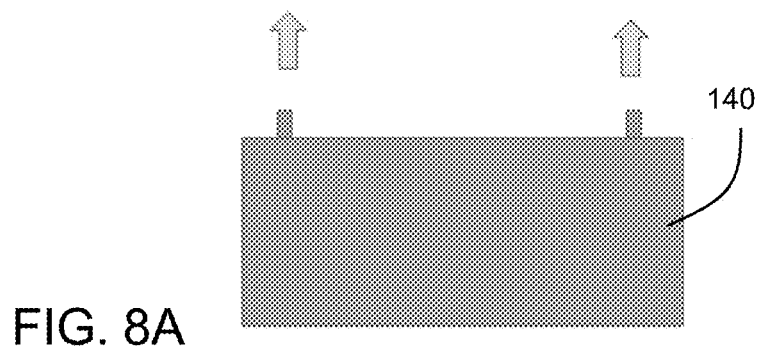
FIGS. 8A-8D illustrates how the structural body of the i-Sprout Green Box can be vertically expanded.
Figure 8B:
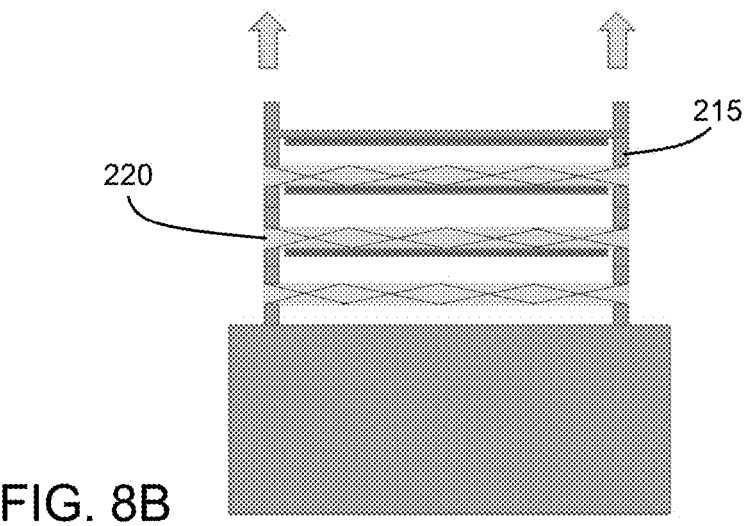
Figure 8C:
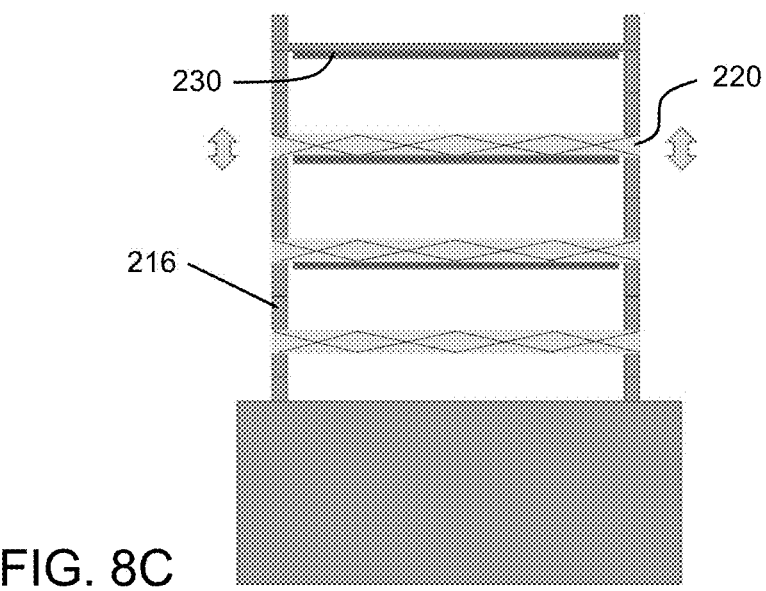
Figure 8D:
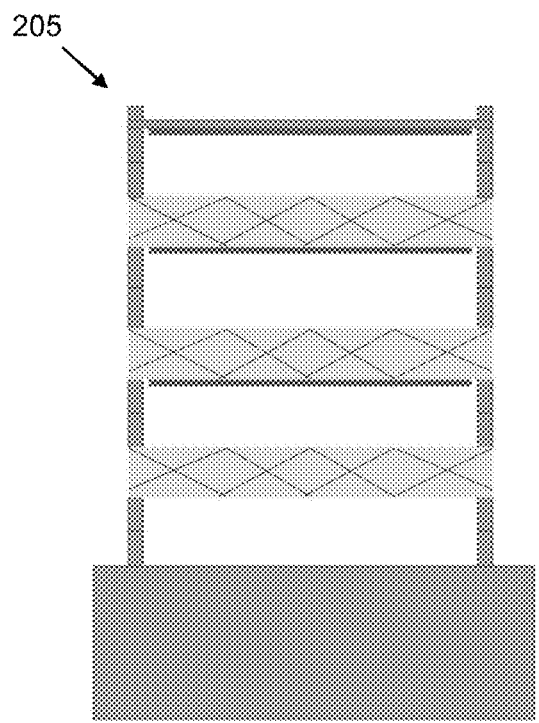
Figure 8E:
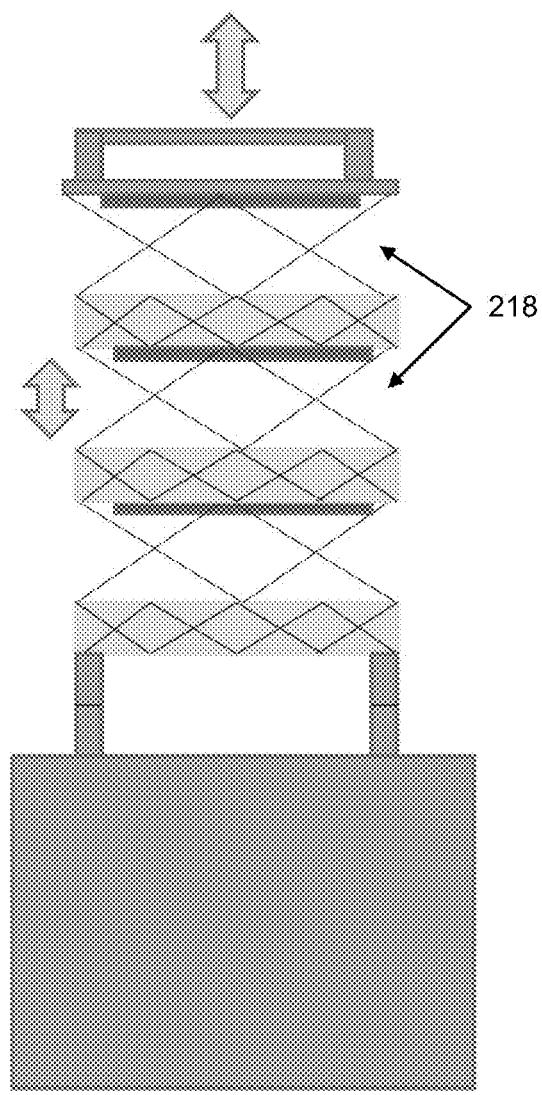
FIG. 8E is an alternative embodiment of the vertically expanded configuration of the i-Sprout Green Box, showing a combination of the extendable/retractable supporting tubes and the expandable/collapsible cross-link mechanisms between adjacent Growing Trays.

In some embodiments, the vertical support frame (215) may comprise extendable and retractable supporting tubes, e.g. telescoping tubes. Referring to FIGS. 8A-8D, the expansion of the structural body of the i-Sprout Green Box is achieved through vertical extension of the supporting tubes (216). For examples, the supporting tubes may be telescoping. In other embodiments, as shown in FIG. 8E, the vertical support frame (215) may comprise extendable and retractable supporting tubes (216), expandable and collapsible cross-linked "X"-shaped subassemblies (218), or a combination thereof. The X-shaped subassemblies may comprise a plurality of bar members pivotally attached to each other at their ends or mid-section to produce a tong-like or scissoring motion. In some embodiments, the frame structure (210) is capable of supporting about 1-20 growing trays (220).

Figure 7:
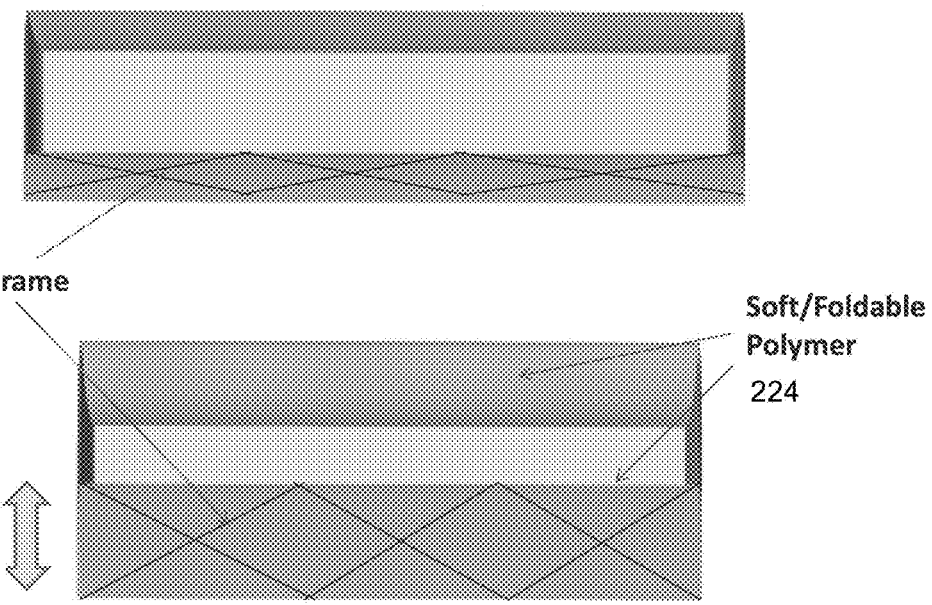
FIG. 7 shows the growing tray with the support frame whose sides are made of collapsible/expandable cross-link mechanism and the inside of the support frame lined with a soft, foldable and flexible polymer that allows for the expansion of the tray.
Figure 9A:
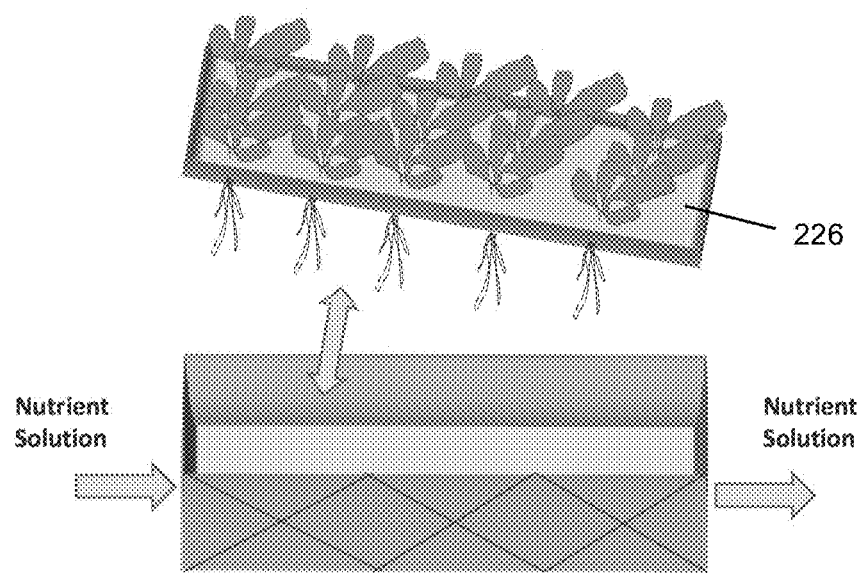
FIG. 9A shows the growing tray with its cover or lid on top of which the crops are distributed for growth, and an exemplary flow of a hydroponic nutrient solution.
Figure 14:
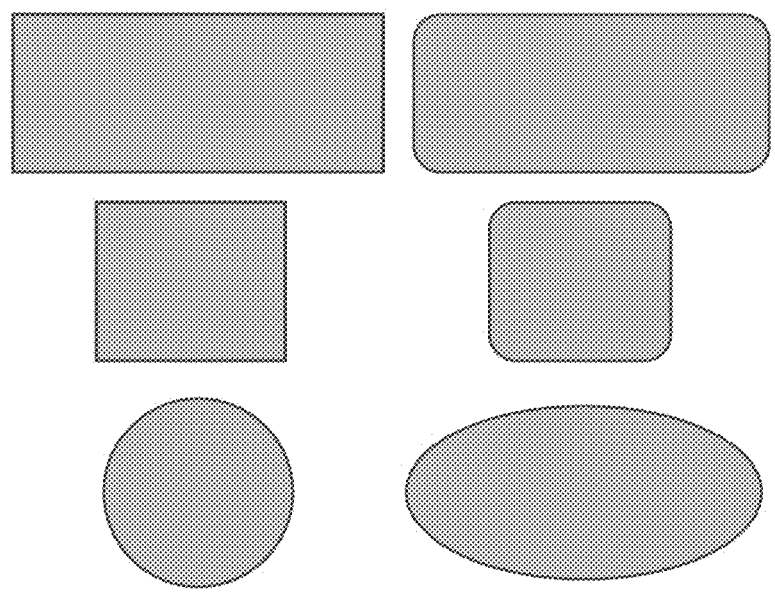
FIG. 14 shows non-limiting embodiments of a shape of the growing trays or the growing pods when viewed from the top.

Referring to FIG. 7, each growing tray (220) may have a growing frame (222) whose sides are made of collapsible/expandable cross-link mechanisms. In one embodiment, the growing frame (222) may comprise expandable and collapsible cross-linked "X"-shaped subassemblies having a plurality of bar members pivotally attached to each other at their ends or mid-section to produce a tong-like or scissoring motion. An interior of the growing frame may be lined with a soft, foldable and flexible polymer (224) that allows for the expansion of the tray. The flexible polymer liner (124) can also contain the liquid nutrients. As shown in FIG. 14, each growing tray may assume a number of possible geometric shapes including, but not limited to, square and rectangular with sharp or rounded corners, circular, elliptical, etc. As shown in FIG. 9A, the growing tray may be covered with a lid on top of which the crops are distributed for growth. In some embodiments, the growing trays (120) can be removeably attached to the frame structure (210), for instance, by a snap-connection, joints, or other fittings.

In some embodiments, the i-Sprout Green Box includes lighting boards that may be attached to or detached from the designated location in the i-Sprout Green Box, such as the frame structure or bottom surface of the growing trays. The growing trays and the lighting boards may be arranged within the frame structure such that each lighting board is positioned over a growing tray, thereby exposing the growing trays to incident lighting from above. Preferably, the spacing between the light boards and the growing trays can be adjusted for efficient illumination of the plants in the growing trays as well as reduced energy consumption. The lighting board (130) may comprise a lighting frame (132) for supporting the light sources (135). In some embodiments, the light sources (135) can be removeably attached to the lighting frame (132) via snap-connections, joints, or other fittings. The light sources (135) may comprise light emitting diodes (LEDs), fluorescent tubes, lamps, or a combination thereof, which can be attached to or detached from a frame of the lighting board. For example, the light rods or tubes can be conveniently connected to or disconnected from the electrical fixtures attached to the frame of the lighting board. This increases the convenience and efficiency of modifying the light quality (or light wavelength combinations) by simply mixing various colors, such as red and blue light emitting diodes (LEDs). In one embodiment, the light sources (135) emit light in the same wavelength, for example, red or blue light. In another embodiment, the light sources (135) may emit light in varying wavelengths, for example, a combination of red light sources and blue light sources. In some embodiments, the light sources may be parallel to each other. For example, the orientation of the parallel light rods or tubes may be lateral or longitudinal relative to the top view of the lighting board. In some embodiments, the lighting board has a variable number of light rods or lamps ranging from about 2 to 20. In one embodiment, the number of light sources may be the same as the number of growing trays. Alternatively, the number of light sources may be the different from the number of growing trays.

In some embodiments, the i-Sprout green box (205) may further comprise a reservoir (140) disposed under the frame structure (210). In one embodiment, as shown in FIG. 8A, when the i-Sprout green box (205) in its collapsed configuration, the frame structure (210), growing trays (220), and optionally, the lighting boards (130) can fit entirely in the reservoir (140) for storage. In another embodiment, the reservoir (140) can be used to contain liquid nutrients when the i-Sprout green box (205) is in use for cultivation.

In other embodiments, the i-Sprout green box (205) may further include a pump (150) and tubing (160) for connecting the pump (150) to the growing trays (220) in order to pump liquid nutrients from the reservoir (140) to the growing trays (220). A discharge hose (165) may fluidly connect the growing trays (220) to the reservoir (140) for discharging the liquid nutrients, thus recycling the nutrient solution. The tubing and discharge hose may be polymer tubing, preferably transparent tubing to allow for visual inspection. In one embodiment, a main tubing channel may be connected to each growing tray (220). For example, each main tubing channel may be fluidly connected to a manifold which connects to the flexible hydroponic tubing of each growing tray. A connection between the main tubing channel and manifold may comprise a valve for controlling the flow rate of fluids to the growing tray. The growing tray may be fluidly connected to the hydroponic tank for recycling the liquid nutrients. For example, each growing tray may be connected to the hydroponic tank via a flexible discharge hose.

Figure 9B:
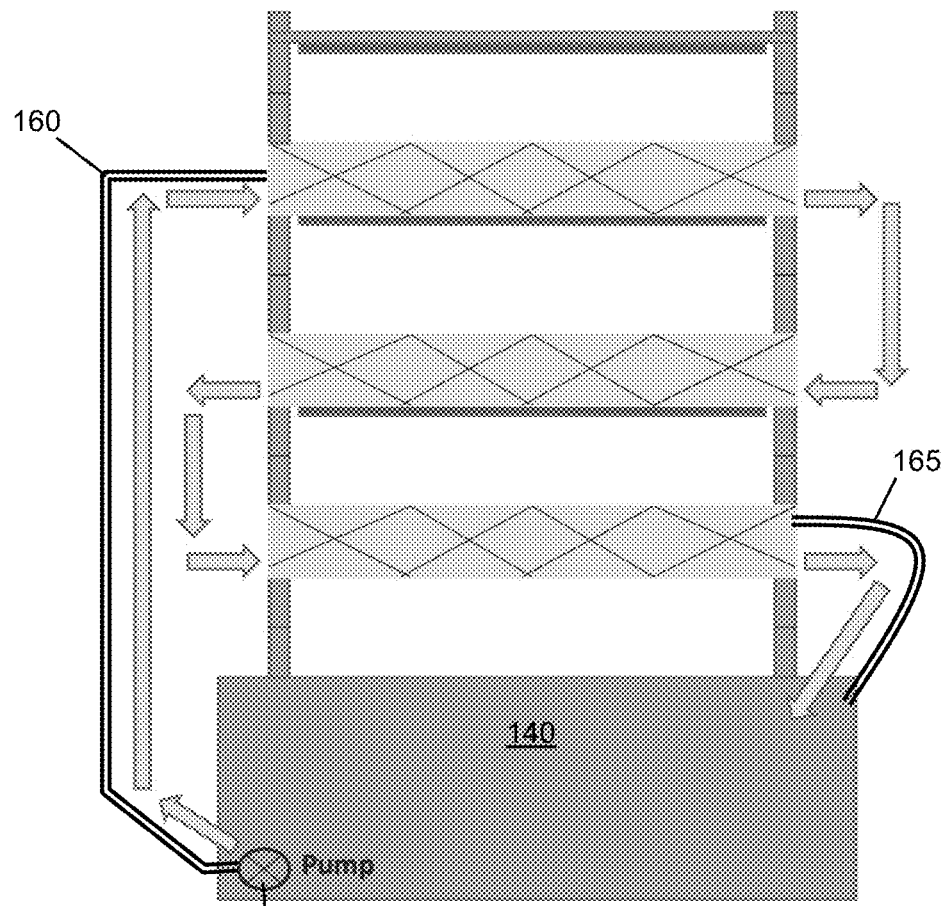
FIG. 9B illustrates a recirculation of the nutrient solution in the i-Sprout Green Box through the growing trays and the hydroponic tank with the help of a pump.

In another embodiment, FIG. 9B illustrates the recirculation of the hydroponic nutrient solution in the i-Sprout Green Box through the growing trays and the hydroponic tank with the help of a pump. Flexible tubing conveys and recirculates the liquid nutrient solution between the growing trays and the hydroponic tank. In some embodiments, a main tubing channel may be connected to the top-most growing tray. The top-most growing tray may be fluidly coupled to a second top-most growing tray; the second top-most growing tray may be fluidly coupled to a lower growing tray, and so forth. In this configuration, the fluids can be introduced to the top-most growing tray, instead of each growing tray, and the fluids can be recycled and gravity fed from the upper growing trays to the lower growing trays. The lower-most growing tray may be connected to the hydroponic tank via a flexible discharge hose for recycling the liquid nutrients.

In some embodiments, each growing tray may be disposed at an angle relative to the horizon along its longitudinal or axial direction to facilitate the gravity-assisted flow of the liquid nutrient solution flowing through it. Typically, the incline angle may range from about 1°-20°. For example, the growing tray may have an inlet tubing disposed on one side of the tray for delivering the nutrient. An outlet tubing may be disposed on an opposing side of the tray for discharging the nutrient. The growing tray can be positioned at an angle such that the inlet tubing is raised higher relative to the outlet tubing, thereby facilitating the gravity-assisted flow of the liquid nutrient. This angle of the growing tray relative to the horizon may be about 1°-20°.

In some embodiments, the frame structure (210) may further comprise panels for covering the frame structure. In other embodiments, the i-Sprout green box (205) may further include module wheels (170) disposed at a base of the vertical frame structure (210) for imparting mobility to the i-Sprout green box (205).

The i-Abacus Green Box

Figure 10:
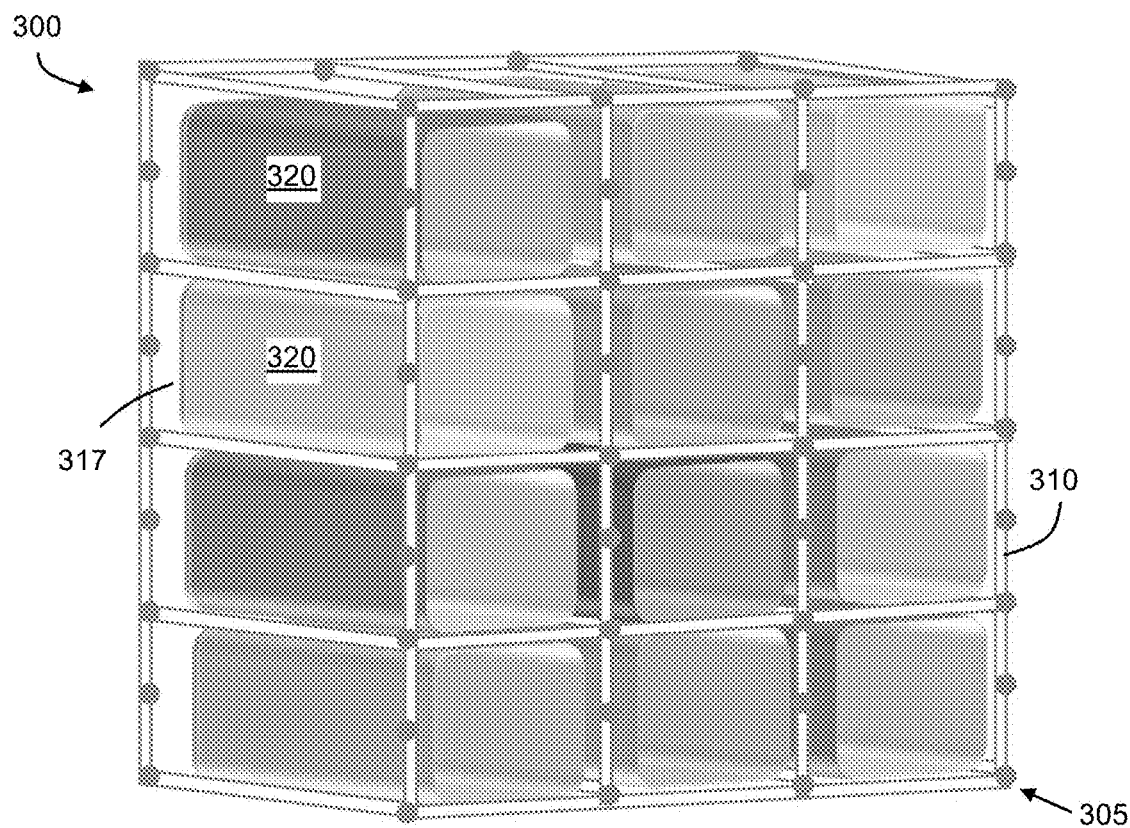
FIG. 10 shows another non-limiting embodiment of the modular cultivation system of the present invention, referred to herein as the "i-Abacus Green Box", with its principal structural components, including: (1) expandable/collapsible growing pods, and (2) expandable/collapsible support frame that houses multiple growing pods.

Referring to FIG. 10, in some embodiments, the growing module (300) is an i-Abacus green box (305). The principal design feature of the i-Abacus Green Box is the ability of its structural body to expand and collapse. The expansion of the structural body of the i-Abacus Green Box is achieved through a folding mechanism of the support frame and of the growing pods. The folding mechanism may be replaced by or used in combination with other support mechanisms that would achieve the desired expansion/collapse of the structural body of the i-Abacus Green Box.

Figure 13A:
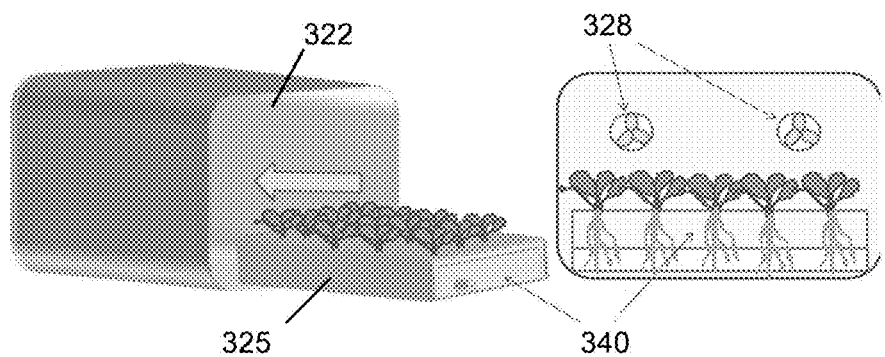
FIG. 13A shows the i-Abacus growing pod, with a hydroponic unit being fitted into the growing pod (left), and the hydroponic unit and ventilation fans inside the growing pod (right).
Figure 13B:
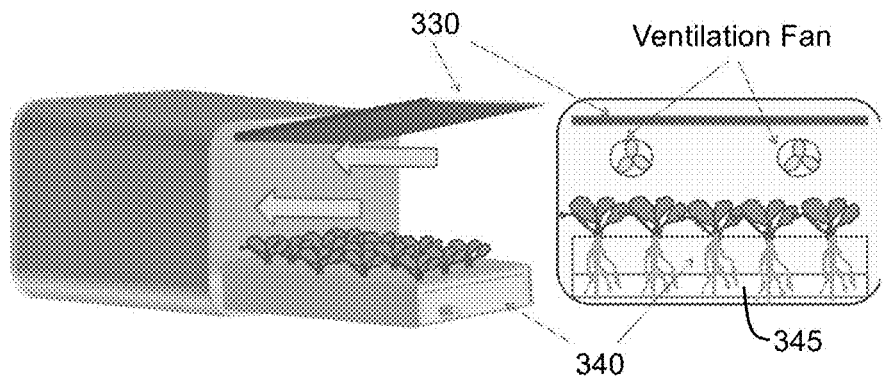
FIG. 13B shows the i-Abacus growing pod, with a lighting board being fitted into the upper portion of the growing pod (left), and the lighting board positioned inside the growing pod (right).
Figure 13C:
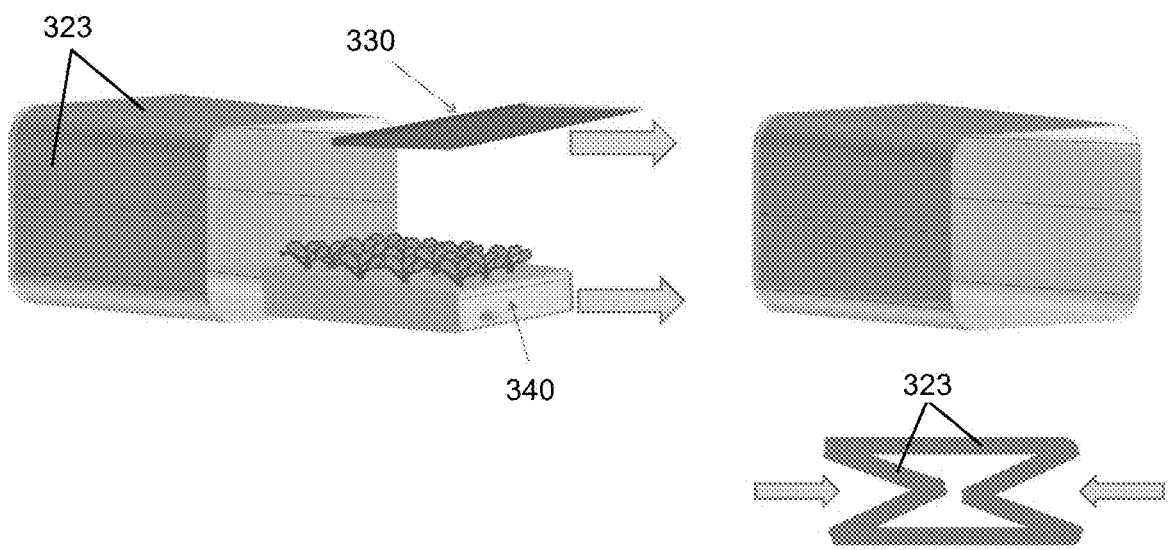
FIG. 13C depicts the collapsibility of each growing pod by first detaching the back side (and the front side, if any) of the growing pod and removing its hydroponic unit and lighting board, and by folding the pod in the inward direction and along the hinged planar segments in the longitudinal or axial direction of the growing pod.

According to some embodiments, the present invention features a modular cultivation system (500) comprising an i-Abacus green box (305). As shown in FIG. 10, the i-Abacus green box (305) may comprise a frame structure (310) comprising an adjustable support frame (315) that form an array of pod openings, and a plurality of growing pods (320) configured to fit inside the pod openings (317). In some embodiments, as shown in FIG. 13A-13C, each growing pod (320) may comprise a collapsible and expandable pod housing (322), a removable growing tray (325) configured to fit inside the pod housing (322), and a lighting board (130) comprising one or more light sources (135). The lighting board (130) may be configured to fit inside the pod housing (322) and attach to an interior surface of the pod housing. In preferred embodiments, the growing tray (325) is configured to contain crops and the light sources (135) are configured to provide lighting to the crops contained in the growing tray (325). In some embodiments, the pod housings (320) are in an expanded configuration when in use. Conversely, the support frame (315) and the pod housings (320) are in a collapsed configuration when the i-Abacus green box (305) is in storage or not in use.

In preferred embodiments, the support frame (315) can be adjusted to increase a space for the growing pods. Without wishing to limit the invention, by adjusting the spacing for the growing pods, this allows for optimal lighting of the crops and sufficient growing space for the plants, which improves convenience and efficiency of the planting or harvesting operation as well as reduced energy consumption. In other preferred embodiments, the pod housing (322) is sized so as to provide spacing between the crops in the growing tray and lighting sources to allow for optimal lighting and growth of the crops. The growing space may be based on a height and other morphological features of the specific crop being grown for optimization of physical spacing and lighting of the crops.

Figure 12A:
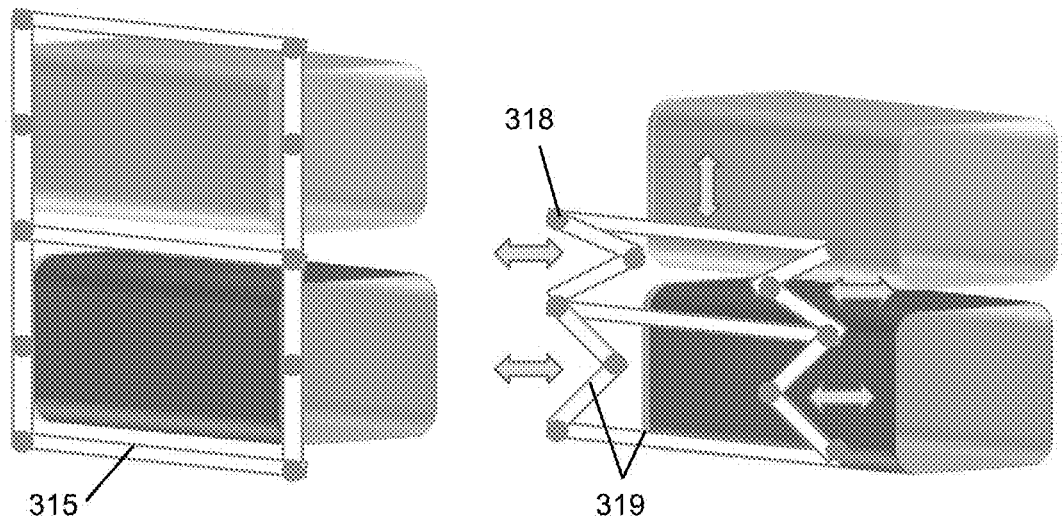
FIG. 12A is a side view of the support frame for the i-Abacus Green Box, showing the segmented-member mechanism of the frame while fully expanded or extended in the operational configuration (left), and being compressed, folded or collapsed for the frame's stowed configuration (right).
Figure 12B:
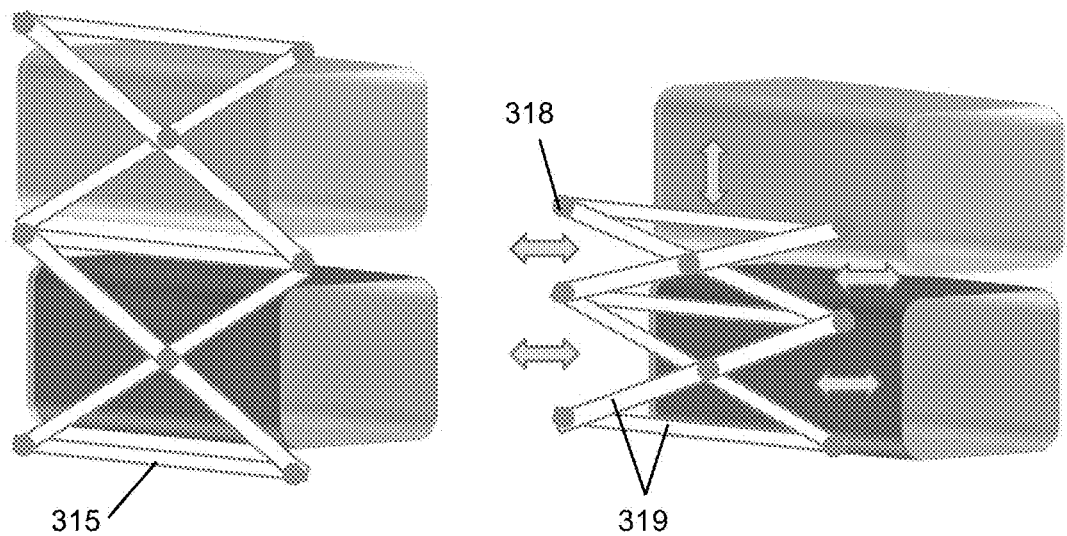
FIG. 12B is a side view of an alternative embodiment of the support frame for, showing a cross-link mechanism of the frame while fully expanded or extended in the operational configuration (left), and being compressed, folded or collapsed for the frame's stow configuration (right).

The expandability and collapsibility of the i-Abacus Green Box support frame is accomplished by employing various mechanisms, including a segmented-member mechanism. In some embodiments, the support frame (315) may comprise expandable and collapsible cross-linked subassemblies (318). Referring to FIGS. 12A-12B, the cross-linked subassemblies may comprise a plurality of bar members pivotally attached to each other to produce a scissoring or folding motion. In one embodiment, as shown in FIG. 12A, the bar members are pivotally attached to each other at their ends. The bar members may also be pivotable at their midsections so as to fold in half. In another embodiment, as shown in FIG. 12B, the bar members may also be pivotally attached to each other at their mid-section so as to form an "X"-shape. The cross-linked subassemblies can expand or collapse is a manner similar to an accordion In some embodiments, the support frame may be any rigid material, including metal or polymer.

In some embodiments, the frame structure (310) may comprise about 2-30 pod openings (317). In other embodiments, the frame structure (310) may comprise more than 30 pod openings (317). In some other embodiments, the frame structure (310) may be configured to hold and support about 1-30 growing pods (320). In further embodiments, the frame structure (310) may be configured to hold and support more than 30 growing pods (320).

The principal design features of the i-Abacus Green Box include an i-Abacus green pod, each equipped with its own detachable hydroponic unit and lighting board. In some embodiments, the growing pod may further comprise a one or more ventilation fans (328) coupled to the pod housing (322). Referring to FIG. 13B, small ventilation fans (328), whose volumetric air flow rate may be adjusted for optimization, may be disposed on the side walls of the pod housing. For example, the ventilation fans can be installed on the back side of the pod housing to enhance air flow and/or circulation inside the growing pod.

Each growing pod of the i-Abacus Green Box is configured to be expandable and collapsible. In some embodiments, the pod housing (320) may be comprised of housing panels (323) pivotably connected to each other. The pod housing (320) can be placed in the collapsed or expanded configuration by folding or unfolding, respectively, along the hinged panels (323) in a longitudinal or axial direction. As shown in FIG. 13C, after detaching the back side (and the front side, if any) of the growing pod as well as removing its hydroponic unit and lighting board, the expandability and collapsibility of the growing pod is accomplished by folding the pod in the inward direction and along the hinged panels in the longitudinal or axial direction of the growing pod. The panels of a growing pods may be connected to one another using hinges or by any other mechanism. Alternatively, instead of hinges, the growing pod may comprise a unitary body with folds that allow the growing pod to fold in itself, like a collapsible box. In some embodiments, the housing panels (323) are planar or curved.

The i-Abacus grow pods may assume varying geometric shapes and different colors and can be made of different materials (e.g., metal, polymer, glass, etc.). The material used (e.g., polymer, glass) can have varying optical properties, that is, opaque, translucent, smoky, transparent, etc. As shown in FIG. 14, the growing pods may assume a number of possible geometric shapes including, but not limited to, square and rectangular with sharp or rounded corners, circular, elliptical, etc. In some embodiments, the growing pods (320) can be removeably attached to the frame structure (310), for instance, by a snap-connection, joints, or other fittings.

Referring to FIGS. 15A-15B, the lighting board (130) may comprise a lighting frame (132) for supporting the light sources (135). Similarly, the light sources (135) can be removeably attached to the lighting frame (132) via snap-connections, joints, or other fittings. In some embodiments, the light sources (135) may comprise light emitting diodes (LEDs), fluorescent tubes, lamps, or a combination thereof, which can be attached to or detached from a frame of the lighting board. For example, the light rods or tubes can be conveniently connected to or disconnected from the electrical fixtures attached to the frame of the lighting board. This increases the convenience and efficiency of modifying the light quality (or light wavelength combinations) by simply mixing various colors, such as red and blue light emitting diodes (LEDs). In one embodiment, the light sources (135) emit light in the same wavelength, for example, red or blue light. In another embodiment, the light sources (135) may emit light in varying wavelengths, for example, a combination of red light sources and blue light sources. In some embodiments, the light sources may be parallel to each other. For example, the orientation of the parallel light rods or tubes may be lateral or longitudinal relative to the top view of the lighting board. In some embodiments, the lighting board has a variable number of light rods or lamps ranging from about 1 to 20.

In some embodiments, the growing tray (325) includes a hydroponic unit (340). Alternatively or in combination, the growing tray (325) can include an aeroponic unit. As shown in FIGS. 13A-13B, the hydroponic unit can fit inside the pod housing (322). In some embodiments, the hydroponic unit (340) may comprise a reservoir (345) disposed inside the growing tray (325). The reservoir (345) can be used to contain liquid nutrients during crop cultivation. In other embodiments, the i-Abacus green box (305) may further include a pump (150) and tubing network (160) for connecting the pump (150) to the hydroponic units (340) in order to pump liquid nutrients through the reservoirs (345), thus recycling the nutrient solution. The tubing and discharge hose may be polymer tubing, preferably transparent tubing to allow for visual inspection.

Figure 11:
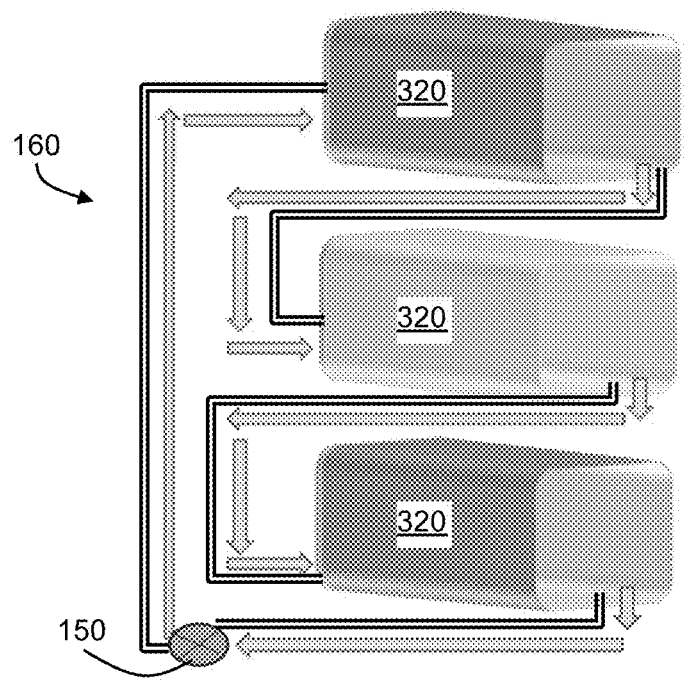
FIG. 11 illustrates the flow and recirculation of the hydroponic nutrient solution between the i-Abacus growing pods, where the hydroponic units are connected to one another and to and from a pump using flexible tubing.

FIG. 11 illustrates the recirculation of the nutrient solution through the hydroponic units with the help of a pump. The hydroponic unit (340) includes the tubing network (160) comprising a plurality of flexible tubes that fluidly connect a reservoir (345) of one growing pod (320) to a reservoir (345) of another growing pod (320). A pump (150) is fluidly coupled to the tubing network (160) for pumping the liquid nutrients through the reservoirs (340), thereby recirculating the liquid nutrient solution. For example, a tube may be connected to a top-most hydroponic unit and the pump. The top-most hydroponic unit may be fluidly coupled to a second top-most hydroponic unit; the second top-most hydroponic unit may be fluidly coupled to a lower hydroponic unit, and so forth. In this configuration, the fluids can be introduced to the top-most hydroponic unit, instead of each hydroponic unit, and the fluids can be recycled and gravity fed from the upper hydroponic units to the lower hydroponic units. The lower-most hydroponic unit is connected back to the pump via a flexible tubing for recirculating the liquid nutrients.

In some embodiments, each growing pod may be disposed at an angle relative to the horizon along its longitudinal or axial direction to facilitate the gravity-assisted flow of the liquid nutrient solution flowing through the hydroponic unit. Typically, the incline angle of the growing pod may range from about 1°-20°. For example, the hydroponic unit may have an inlet tubing disposed on one side of the tray for delivering the nutrients. An outlet tubing may be disposed on an opposing side of the hydroponic unit for discharging the nutrients. The hydroponic unit can be positioned at an angle such that the inlet tubing is raised higher relative to the outlet tubing, thereby facilitating the gravity-assisted flow of the liquid nutrient. This angle of the hydroponic unit relative to the horizon may be about 1°-20°.

In some embodiments, panels are used for covering the frame structure. In other embodiments, the i-Abacus green box (305) may further include module wheels (170) disposed at a base of the vertical frame structure (310) for imparting mobility to the i-Abacus green box (305).

Mover Robot

In some embodiments, the present invention features an ambulatory cultivation system (500), referred to as Life-Grow Robot or LGBot, comprising the growing module (100) described herein and a mover robot (400). The growing module (100) is secured to rest atop the mover robot (400), becoming one whole unit. In one embodiment, the LGBot typically has its own designated mover robot (400). In some embodiments, a group of LGBots may share a single communal mover robot (400), with the mover robot (400) serving the LGBot that needs to move at a given time. In other embodiments, two or more growing modules (100) may be secured to rest atop of a single mover robot (400). In some embodiments, the mover robot (200) may be controlled and moved via remote control.

In some embodiments, two or more mover robots (400) may impart mobility to a large or relatively large growing module. As a non-limiting example, a single growing module or collection of growing modules may jointly disposed on top of two or more of the mover robots. The mover robots may sequentially impart mobility to two or more growing modules. As a non-limiting example, a first growing module may disposed on top of a mover robot, which is configured to move the first growing module and leave it in a designated location before the mover robot goes to a location of the next growing module that needs to be moved. Two or more of the mover robots may be configured to act in tandem for sequentially imparting mobility to two or more large or relatively large growing modules. As a non-limiting example, a first growing module may be disposed on top of a pair or team of the mover robots, which are configured to move together in close coordination and leave the growing module in a designated location before the pair or team of mover robots go to the location of the next large growing module that needs to be moved. As such, one or more of the mover robots, acting individually or in unison, may serve to impart mobility to a plurality of growing modules in a sequential fashion.

In some embodiments, the mover robot (400) of the LGBot may be any ambulatory robot. In a non-limiting embodiment, a mover robot (400) may comprise a body with a platform, a power source such as a rechargeable battery, and a ground propulsion system comprising a motor, a motor controller, gear box, and wheels, rollers, or moveable track. The growing module (100) can be placed on top of the platform. As shown in FIGS. 16A-16E, the robot body may be in the shape of a box. The robot body may further include a label or identification number of the robot. The mover robot (400) may further comprise a transceiver for receiving signals from a remote controller and transmitting signals to the remote controller or another processing device, such as a computer or handheld computing device. The motor controller may include a processor and a memory coupled to the processor. The processor may also be operatively coupled to the transceiver. The memory stores computer readable instructions that, when executed by the processor upon receiving a signal from the transceiver, causes the mover robot (400) to perform movements such as moving in a forward or reverse direction, turning, or stopping, among other functions.

In some embodiments, the growing module (100) of the LGBot may be any modular type of cultivation system with multiple stacks of growing shelves. The growing module (100) may vary in geometric shape, size, number of pods, trays and shelves, number of stack levels, etc. A growing space of a crop may be determined based on a height and other morphological features of the specific crop being grown for optimization of physical spacing and incident lighting. In some embodiments, the growing trays or pods may be tubular, rectangular or of any geometric configuration. The growing shelves may be adjustable and/or automated in terms of shelf angular orientation, lighting system angular orientation, relative shelf spacing or distance, etc. In other embodiments, the growing shelves may be hydroponic or aeroponic. Examples of the growing modules include, but are not limited to, the i-Sprout Green Box, i-Incline Green Box, and i-Abacus Green Box. It is to be understood that other growing modules may be used in conjunction with the mover robot (400) without deviating from the scope of the present invention.

In one embodiment, a frame structure (110) may be configured to form a plurality of shelves that support the growing trays or pods. For example, the frame structure (110) may form about 2-30 shelves, and each shelf is configured to support about 2-20 growing trays or pods. In some embodiments, the shelves may be stacked vertically or horizontally. In other embodiments, the frame structure (110) may include panels, which can be transparent or opaque, for covering the frame structure. In other embodiments, the growing module (110) may further include its own nutrient reservoir, pump, and plumbing system. The reservoir can store liquid nutrients. The pump and tubing can deliver liquid nutrients from the reservoir to the growing trays or pods. In one embodiment, the liquid can be recycled back to the reservoir and replenished with nutrients.

In some embodiments, the growing module of the LGBot may have its own lighting system (130) for its growing shelves. In other embodiments, the lighting may be provided by the growing room within which the LGBots are located during the crop growing period. A lighting space for the crop may be determined based on the height and other morphological features of the specific crop being grown for optimization of incident lighting. Examples of the light sources include but are not limited to, light emitting diodes (LEDs), fluorescent tubes, or a combination thereof. In some embodiments, each light source emits light in the same wavelength or varying wavelengths, such as red light or blue light.

In some embodiments, any of the cultivation systems described herein may further comprise an exterior casing for housing the growing module. For example, the exterior casing may be a standardized modular unit, such as a shipping container. The shipping container qualifies as a pre-existing example of such modular unit that can be repurposed for Vertical Farming. In other embodiments, the modular units can be stacked vertically and arranged in a number of geometric configurations to achieve optimal use of land area and also to optimize growing operations, which could include the use of elevators to move growers to gain access to the individual modules. The possible geometric configurations for the Vertical Farm include, but are not limited to: (1) cylindrical configurations, where columns of the vertically stacked modules linked end-to-end radiate outwardly from a central core; or (2) linear configurations, where columns of the vertically stacked modules linked end-to-end are arranged in parallel.

In some embodiments, any of the systems described herein may utilize alternative energy sources to power the electrical components of the system. For example, the light sources, pumps, and digital components may be powered by solar or wind energy solely, or in combination with power from the power grid. This may further reduce the energy usage and cost of Vertical Farming.

Without wishing to limit the invention to a particular theory or mechanism, the modularity of the cultivation system provides significant convenience in installation and removal of the growing system within the modular Vertical Farm. It also provides significant convenience in the scale up of production through the addition or removal of modular units. For example, multiple modular units may be used together. The cultivation systems of the present invention also makes crop cultivation protocols in terms of lighting, nutrient delivery and overall optimization amenable to automation and remote control.

Circular Automated Operational Protocol

According to some embodiments, the mobile vertical farm makes use of a plurality of ambulatory LGBots. The LGBots may spend most of their time in a multistory growing room, but can move periodically to a harvest room and a planting room as scheduled before returning again to the growing room. This forms a circular automated operational protocol as illustrated in FIG. 17.

Figure 17:
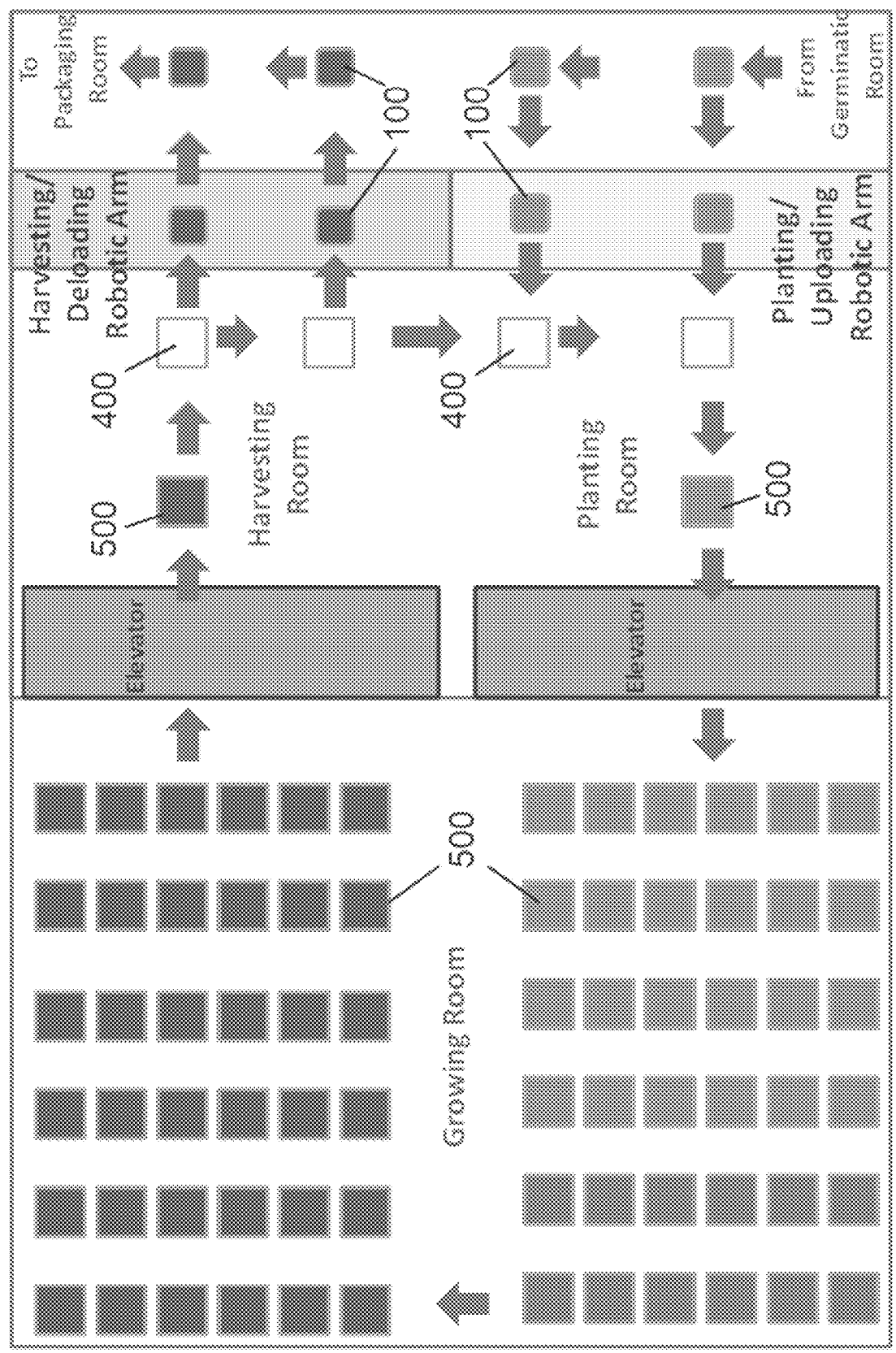
FIG. 17 shows a non-limiting schematic of a cyclical automated operational protocol followed by the ambulatory LGBots as they move periodically as scheduled from a multistory growing room to a harvesting room to a planting room and back again to a growing room of the vertical farm.

FIG. 17 shows that the LGBot circular automated operational protocol allows for highly efficient and complete automation of the principal operations within the vertical farm as desired. Robotic arms may be used for unloading/harvesting and uploading/planting of the LGBots. In one embodiment, the harvesting/unloading task from the LGBot and the planting/uploading task to the LGBot may be automated using any type of appropriate robotic arm. Alternatively, both tasks may remain performed by human workers as desired.

Figure 18:
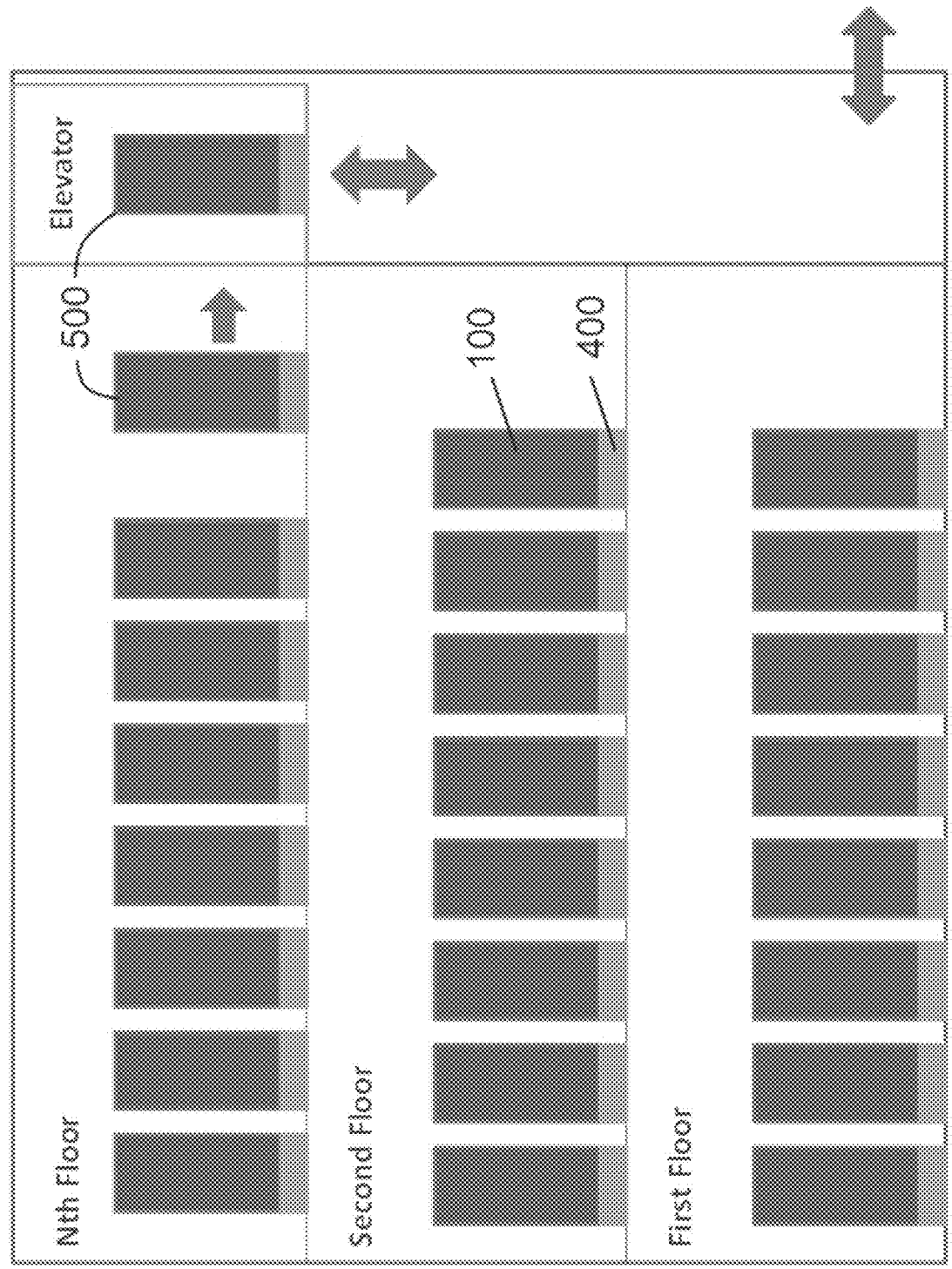
FIG. 18 is another schematic showing a sample floor layout for the ambulatory LGBots in a multistory growing room and how the LGBots move between different floor levels.

As shown in FIG. 18, the vertical farm may be situated in a multi-story facility to increase production capacity. The facility may have "n" levels or floors, where n can range from 1 to 20. In other embodiments, the facility may have over 20 levels or floors. Elevators may be used to transport the LGBots to different levels. Each floor or level may be adapted to house multiple cultivation systems. For instance, a floor may contain about 5 to 100 cultivation systems (500).

In other embodiments, a floor may contain over 100 cultivation systems (500). In one embodiment, a single level may be divided into multiple sections that separate the LGBots according to the growth stage of the crop. In another embodiment, the levels of the farm facility may be used to separate the LGBots according to the growth stage of the crop.

In preferred embodiments, environmental conditions inside each growing section or room may be optimized to achieve both maximum crop growth/yield and maximum crop nutritive value. For instance, referring again to FIG. 17, which is a top view of a level, the lower section of the of the growing room may be provided with optimal environmental conditions, including light intensity, light daily photoperiod, light quality, ambient temperature, relative humidity, ambient carbon dioxide ($CO_2$) level, etc., to optimize crop growth and yield as the LGBots move through that section of the growing room. Subsequently, as the LGBots reach the upper section of the growing room, the environmental conditions, including light intensity, light daily photoperiod, light quality, ambient temperature, relative humidity, ambient $CO_2$ level, etc., in that upper section may be varied and optimized so that crop nutritive value is maximized by the time the LGBots move out of that section of the growing room.

In some embodiments, the growing room, harvesting room and planting room may be of any size and shape, such as square or rectangular, to accommodate the number of cultivation systems. Furthermore, the vertical farm may comprise any number of growing rooms and any number of levels. The levels themselves may contain multiple growing rooms. Movement of crops within the vertical farm is conveniently carried out by remotely commanding the specific LGbots to move autonomously to any room or any level within the vertical farm.

Without wishing to limit the present invention to a particular theory or mechanism, the circular automated operational protocol for planting, growing and harvesting as implemented by the LGBots can have the following advantages:

(1) Access for crop planting, maintenance and harvesting no longer requires the use of a cherry picker or similar ponderous machineries for a worker to move in the upward, downward, left and/or right directions.

(2) Access is conveniently carried out through automation, that is, by commanding the specific LGBots to move autonomously to designated locations in the vertical farming plant.

(3) Allows for highest standards for clean/contamination-free environment for the growing room: No personnel enters the growing room while in operation; Planting takes place outside of the growing room; Retrieval of certain crops for direct human inspection or disposal as needed takes place outside of the growing room; and Harvesting takes place outside of the growing room.

(4) Allows for minimal use of human labor since no human assistance is typically required inside the growing room.

(5) Allows for maximum safety for workers.

(6) Allows for optimizing environmental conditions inside each level of the growing room to maximize both crop growth/yield and crop nutritive value.

(7) Allows for highly efficient and complete automation of operations as desired, including the use of robotic arms for unloading/harvesting and uploading/planting of the LGBots.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A modular cultivation system (500) comprising a growing module having an adjustable frame structure configured to support a plurality of growing trays for containing crops wherein the growing module comprises:
   a. the frame structure comprising an adjustable vertical support frame (115), a plurality of growing boards (120) coupled to the vertical support f rame (115), and a plurality of lighting boards (130) coupled to the vertical support frame (115), wherein the growing boards (120) are vertically stacked in parallel, wherein one lighting board (130) is disposed above one growing board (120), and the vertical support frame comprises extendable and retractable support tubes;
   b. the plurality of growing trays removably attached to the growing board (120); and
   c. a plurality of light sources (135) attached to lighting board (130), wherein the light sources (135) are configured to provide lighting to the crops contained in the growing trays directly below the light sources (135);
   wherein the adjustable vertical support frame (115) comprises extendable and retractable support tubes configured to be adjusted to increase a height of the vertical support frame (115), wherein adjusting the vertical support frame (115) changes spacing between the growing boards (120), wherein an angle (127) of each growing board (120) relative to the vertical support frame (115) is adjustable to an acute angle from a 90° angle, wherein an angle (137) of each lighting board (130) relative to the vertical support frame (115) is adjustable to an acute angle from a 90° angle, and wherein the growing boards and the lighting boards are configured to be adjusted independently; and
   wherein the system further comprises a mover robot for imparting mobility to the growing module, wherein the growing module is disposed on top of the mover robot.

2. The system (500) of claim 1, further comprising two or more mover robots (400) for imparting mobility to a growing module, wherein the growing module is disposed on top of two or more of the mover robots.

3. The system (500) of claim 1, further comprising a mover robot (400) for sequentially imparting mobility to two or more growing modules, wherein a first growing module is disposed on top of the mover robot, which is configured to move the first growing module and leave it in a designated location before the mover robot goes to a location of the next growing module that needs to be moved.

4. The system (500) of claim 1, further comprising two or more mover robots (400) configured to act in tandem for sequentially imparting mobility to two or more growing modules, wherein a first growing module is disposed on top of a pair or team of the mover robots, which are configured to move together in close coordination and leave the growing module in a designated location before the pair or team of mover robots go to the location of the next growing module that needs to be moved.

5. A modular cultivation system (500) comprising a growing module having an adjustable frame structure configured to support a plurality of growing trays for containing crops, wherein the growing module comprises:
   a. the frame structure comprising an adjustable vertical support frame (115), a plurality of growing boards (120) coupled to the vertical support frame (115), and a plurality of lighting boards (130) coupled to the vertical support frame (115), wherein the growing boards (120) are vertically stacked in parallel, wherein one lighting board (130) is disposed above one growing board (120), and the vertical support frame comprises extendable and retractable support tubes;
   b. the plurality of growing trays removably attached to the growing board (120); and
   c. a plurality of light sources (135) attached to lighting board (130), wherein the light sources (135) are configured to provide lighting to the crops contained in the growing trays directly below the light sources (135);
   wherein the adjustable vertical support frame (115) comprises extendable and retractable support tubes configured to be adjusted to increase a height of the vertical support frame (115), wherein adjusting the vertical support frame (115) changes spacing between the growing boards (120), wherein an angle (127) of each growing board (120) relative to the vertical support frame (115) is adjustable to an acute angle from a 90° angle, wherein an angle (137) of each lighting board (130) relative to the vertical support frame (115) is adjustable to an acute angle from a 90° angle, and wherein the growing boards and the lighting boards are configured to be adjusted independently.

6. The system (500) of claim 5, wherein adjusting the vertical support frame (115) further changes spacing between the growing boards (120) and the lighting boards (130), wherein adjusting the spacing of the growing and lighting boards allows for adjustment of a distance between the crops and the light sources to allow for optimal lighting of the crops.

7. The system (500) of claim 5, wherein the growing board (120) comprises a growing frame (122) for supporting the growing trays, wherein the growing trays are removably attached to the growing frame (122).

8. The system (500) of claim 5, wherein the lighting board (130) comprises a lighting frame (132) for supporting the light sources (135), wherein the light sources (135) are removably attached to the lighting frame (132).

9. The system (500) of claim 5, wherein each growing board (120) is configured to pivot about the vertical support frame (115) to change the angle (127).

10. The system (500) of claim 5, wherein each lighting board (130) is configured to pivot about the vertical support frame (115) to change the angle (137).

\* \* \* \* \*